(12) United States Patent
Ryu et al.

(10) Patent No.: US 9,991,249 B2
(45) Date of Patent: Jun. 5, 2018

(54) INTEGRATED CIRCUIT AND COMPUTER-IMPLEMENTED METHOD OF MANUFACTURING THE SAME

(71) Applicant: SAMSUNG ELECTRONICS CO., LTD., Suwon-si, Gyeonggi-do (KR)

(72) Inventors: Seong-Min Ryu, Hwaseong-si (KR); Hyo-Sig Won, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days. days.

(21) Appl. No.: 15/420,514

(22) Filed: Jan. 31, 2017

(65) Prior Publication Data
US 2017/0236814 A1   Aug. 17, 2017

(30) Foreign Application Priority Data

Feb. 11, 2016 (KR) .................. 10-2016-0015820
Aug. 5, 2016 (KR) .................. 10-2016-0100122

(51) Int. Cl.
*G06F 17/00* (2006.01)
*H01L 27/02* (2006.01)
(Continued)

(52) U.S. Cl.
CPC ...... *H01L 27/0207* (2013.01); *G06F 17/5072* (2013.01); *G06F 17/5077* (2013.01);
(Continued)

(58) Field of Classification Search
USPC ........................................................ 716/113
See application file for complete search history.

(56) References Cited

U.S. PATENT DOCUMENTS 6,368,939 B1   4/2002   Sasaki
6,841,844 B2   1/2005   Hsu et al.
(Continued)

FOREIGN PATENT DOCUMENTS

JP   07-326670   12/1995
KR   10-1098920  12/2011

OTHER PUBLICATIONS

S. Natarajan, et al., A 1.4nm Logic Technology Featuring 2nd-Generation FinFET Transistors, Air-Gapped Interconnects, Self-Aligned Double Patterning and a 0.0588UM2 SRAM Cell Size, IEEE, 2014, pp. 3.7.1-3.7.3.
(Continued)

*Primary Examiner* — Mohammed Alam
(74) *Attorney, Agent, or Firm* — F. Chau & Associates, LLC

(57) ABSTRACT

A computer-implemented method of manufacturing an integrated circuit includes placing a plurality of standard cells that define the integrated circuit, selecting a timing critical path from among a plurality of timing paths included in the placed standard cells, and selecting at least one net from among a plurality of nets included in the timing critical path as at least one timing critical net. The method further includes pre-routing the at least one timing critical net with an air-gap layer, routing unselected nets, generating a layout using the pre-routed at least one timing critical net and the routed unselected nets, and manufacturing the integrated circuit based on the layout.

17 Claims, 27 Drawing Sheets

(51) Int. Cl.
*G06F 17/50* (2006.01)
*H01L 21/768* (2006.01)
*H01L 23/522* (2006.01)
*H01L 23/528* (2006.01)
*H01L 23/532* (2006.01)

(52) U.S. Cl.
CPC ...... *G06F 17/5081* (2013.01); *H01L 21/7682* (2013.01); *H01L 21/76877* (2013.01); *H01L 23/528* (2013.01); *H01L 23/5226* (2013.01); *H01L 23/5329* (2013.01); *H01L 23/5222* (2013.01); *H01L 23/53295* (2013.01)

(56) References Cited

U.S. PATENT DOCUMENTS

| | | | |
|---|---|---|---|
| 6,867,125 B2 | 3/2005 | Kloster et al. | |
| 7,371,653 B2 | 5/2008 | Kim | |
| 7,589,425 B2 | 9/2009 | Daamen et al. | |
| 7,698,671 B2 | 4/2010 | Fujii et al. | |
| 7,807,564 B2 | 10/2010 | Chen | |
| 7,871,923 B2 | 1/2011 | Liu et al. | |
| 7,913,221 B2 | 3/2011 | Miyashita et al. | |
| 7,979,824 B2 | 7/2011 | Aguado Granados et al. | |
| 7,989,337 B2 | 8/2011 | Aguado Granados et al. | |
| 8,054,355 B2 | 11/2011 | McCarten et al. | |
| 8,108,820 B2 | 1/2012 | Aguado Granados et al. | |
| 9,349,766 B2 | 5/2016 | Sugiura | |
| 2013/0256758 A1* | 10/2013 | Camillo-Castillo | H01L 29/0649 257/197 |
| 2014/0167219 A1* | 6/2014 | Cooney, III | H01L 23/5227 257/531 |
| 2015/0021738 A1* | 1/2015 | Camillo-Castillo | H01L 29/0649 257/565 |
| 2015/0146476 A1 | 5/2015 | Zhang et al. | |
| 2016/0147928 A1* | 5/2016 | Ho | G06F 17/5072 716/114 |

OTHER PUBLICATIONS

H.J. Yoo, et al., "Demonstration of a Reliable High-Performance and Yielding Air Gap Interconnect Process," IEEE, 2010, pp. 1-3.

* cited by examiner

INTEGRATED CIRCUIT AND COMPUTER-IMPLEMENTED METHOD OF MANUFACTURING THE SAME

CROSS-REFERENCE TO RELATED APPLICATIONS

This application claims priority under 35 U.S.C. § 119 to Korean Patent Application No. 10-2016-0015820, filed on Feb. 11, 2016, and Korean Patent Application No. 10-2016-0100122, filed on Aug. 5, 2016, the disclosures of which are incorporated by reference herein in their entireties.

TECHNICAL FIELD

Exemplary embodiments of the inventive concept relate to an integrated circuit, and more particularly, to an integrated circuit including an air-gap layer, and a computer-implemented method of manufacturing the same.

DISCUSSION OF THE RELATED ART

As semiconductor process technology advances, the processes are becoming increasingly fine. As a result, parasitic capacitances may increase as the intervals between conductive patterns decrease. To decrease the parasitic capacitances, air gap technology in which an air-gap pattern is placed between conductive patterns is being implemented. Since air has a small dielectric constant, a parasitic capacitance may be reduced by an air gap pattern, and an operational speed of a semiconductor chip may be improved.

SUMMARY

According to an exemplary embodiment of the inventive concept, a computer-implemented method of manufacturing an integrated circuit includes placing a plurality of standard cells that define the integrated circuit, selecting a timing critical path from among a plurality of timing paths included in the placed standard cells, selecting at least one net from among a plurality of nets included in the timing critical path as at least one timing critical net, pre-routing the at least one timing critical net with an air-gap layer, routing unselected nets, generating a layout using the pre-routed at least one timing critical net and the routed unselected nets, and manufacturing the integrated circuit based on the layout.

According to an exemplary embodiment of the inventive concept, an integrated circuit includes a first conductive pattern extending in a first direction, a second conductive pattern extending in a second direction different from the first direction, a first via electrically connecting the first conductive pattern and the second conductive pattern, and first to fourth air-gap patterns. The first air-gap pattern extends in the first direction and is disposed on a first side of the first conductive pattern. The second air-gap pattern extends in the first direction and is disposed on a second side of the first conductive pattern. The first side of the first conductive pattern is opposite the second side of the first conductive pattern. The third air-gap pattern extends in the second direction and is disposed on a first side of the second conductive pattern. The fourth air-gap pattern extends in the second direction and is disposed on a second side of the second conductive pattern. The first side of the second conductive pattern is opposite the second side of the second conductive pattern.

According to an exemplary embodiment of the inventive concept, an integrated circuit includes a first conductive pattern extending in a first direction, a second conductive pattern extending in a second direction different from the first direction, a first via electrically connecting the first conductive pattern and the second conductive pattern, a first air-gap pattern extending in the first direction and disposed on a first side of the first conductive pattern, and a second air-gap pattern extending in the second direction and disposed on a first side of the second conductive pattern.

According to an exemplary embodiment of the inventive concept, an integrated circuit includes a first conductive pattern extending in a first direction, a second conductive pattern extending in a second direction different from the first direction, a third conductive pattern extending in the first direction, and first to third air-gap patterns. The first air-gap pattern extends in the first direction and is disposed on a first side of the first conductive pattern. The second air-gap pattern extends in the second direction and is disposed on a first side of the second conductive pattern. The third air-gap pattern extends in the first direction and is disposed on a first side of the third conductive pattern. The first conductive pattern, the second conductive pattern, the third conductive pattern, the first air-gap pattern, the second air-gap pattern, and the third air-gap pattern are disposed in a same layer.

According to an exemplary embodiment of the inventive concept, a standard cell defining an integrated circuit includes a first active area, a second active area, a plurality of fins extending in a first direction, a plurality of first metal lines extending in a second direction that crosses the first direction, and a second metal line extending in the first direction. The plurality of first metal lines and the second metal line are disposed between the first active area and the second active area. The standard cell further includes a plurality of first air-gap patterns that extends in the second direction and is disposed between the plurality of first metal lines, and a second air-gap pattern that extends in the first direction and is disposed on a first side of the second metal line.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
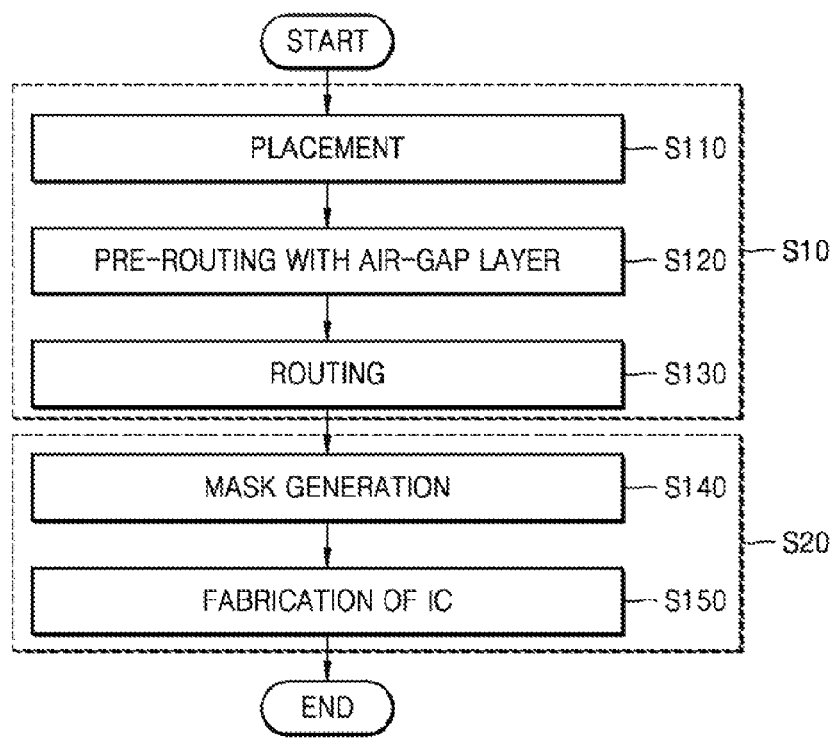
FIG. 1 is a flowchart illustrating a method of manufacturing an integrated circuit, according to au exemplary embodiment of the inventive concept.

Exemplary embodiments of the present inventive concept will be described more fully hereinafter with, reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment. It will be further understood that when two components or directions are described as extending substantially parallel or perpendicular to each other, the two components or directions extend exactly parallel or perpendicular to each other, or extend approximately parallel or perpendicular to each other as would be understood by a person having ordinary skill in the art.

FIG. 1 is a flowchart illustrating a method of manufacturing an integrated circuit, according to an exemplary embodiment of the inventive concept.

Referring to FIG. 1, according to an exemplary embodiment, a method of manufacturing an integrated circuit may include an integrated circuit designing operation S10 and an integrated circuit manufacturing process S20. The integrated circuit designing operation S10 may include operations S110 to S130, in which a layout of an integrated circuit is designed using a tool for designing an integrated circuit. In this case, the tool for designing the integrated circuit may be a program including a plurality of instructions executed by a processor. The program may be stored on a memory. Accordingly, the integrated circuit designing operation S10 may be referred to as a computer-implemented method of designing an integrated circuit that may be executed by a processor. The integrated circuit manufacturing process S20 corresponds to an operation of manufacturing a semiconductor device according to an integrated circuit based on a designed layout, and may be performed by a semiconductor process device.

An integrated circuit may be defined by a plurality of cells. For example, an integrated circuit may be designed using a cell library that includes characteristic information of the plurality of cells. For example, in a cell library, cell names, dimensions, gate widths, pins, delay characteristics, leakage currents, threshold voltages, and functions of cells may be defined. In exemplary embodiments, the cell library may be a standard cell library. The standard cell library may include information such as, for example, layout information and timing information of a plurality of standard cells. The cell library, including the standard cell library, may be stored in a computer-readable storage medium.

In operation S110, standard cells that define an integrated circuit are placed. Operation S110 may be performed, for example, by a processor using a placement and routing (P/R) tool. First, input data defining an integrated circuit is received. Here, the input data may be generated by synthesizing data defined in an abstract form for behaviors of an integrated circuit, for example, data defined in a register transfer level (RTL), by using a standard cell library. The input data may be, for example, a bitstream or a netlist generated by synthesizing integrated circuits defined by a VHSIC hardware description language (VHDL) and a hardware description language (HDL) such as, for example, VERILOG. Subsequently, a storage medium storing a standard cell library is accessed, and standard cells, which are selected from among a plurality of standard cells stored in the standard cell library according to the input data, are placed.

In operation S120, a net selected from the placed standard cells is pre-routed with an air-gap layer, as described further below. In operation S130, nets that are not selected from the placed standard cells are routed (e.g., without an air-gap layer). Herein, an air-gap layer refers to a layer including an air gap or an air-gap pattern. For example, at least one of the plurality of nets included in the placed standard cells may be selected, and the selected at least one net may be allocated to an air-gap layer. In an exemplary embodiment, the at least one net may correspond to one net of a timing critical path, as described further below.

Herein, the net may represent an equipotential in an equivalent circuit diagram of an integrated circuit. One net may correspond to one interconnection in a layout of an integrated circuit. The interconnection may correspond to, for example, a wiring structure including a plurality of wiring layers electrically connected to one another and vias. Each of the wiring layers may include, for example, a plurality of conductive patterns. The conductive patterns formed in the wiring layers, which may be disposed on different levels, may be electrically connected to one another through a via formed of a conductive material. In exemplary embodiments, the wiring layers may include a metal as a conductive material, and may be referred to as metal layers. In exemplary embodiments, the wiring layers may include a conductive material other than a metal.

According to an exemplary embodiment, the net may include a first conductive pattern included in a first wiring layer, a second conductive pattern included in a second wiring layer, and a via disposed between the first conductive pattern and the second conductive pattern that electrically connects the first conductive pattern and the second conductive pattern. The first wiring layer and the second wiring layer may be disposed at different levels. However, the inventive concept is not limited thereto. For example, in exemplary embodiments, the net may include conductive patterns included in the same wiring layer. Further, in exemplary embodiments, the net may include a plurality of first conductive patterns included in the first wiring layer and a plurality of second conductive patterns included in the second wiring layer.

According to an exemplary embodiment, as an air-gap pattern is disposed adjacent (e.g., directly adjacent) to a conductive pattern corresponding to the selected net, the selected net may be pre-routed by an air-gap layer. In an exemplary embodiment, the air-gap layer may be implemented by a bidirectional air-gap layer. For example, the air-gap pattern included in the air-gap layer may extend in a first direction or may extend in a second direction that is substantially perpendicular to the first direction. Hereinafter, an air-gap layer according to an exemplary embodiment will be described with reference to FIG. 2A.

Figure 2A:
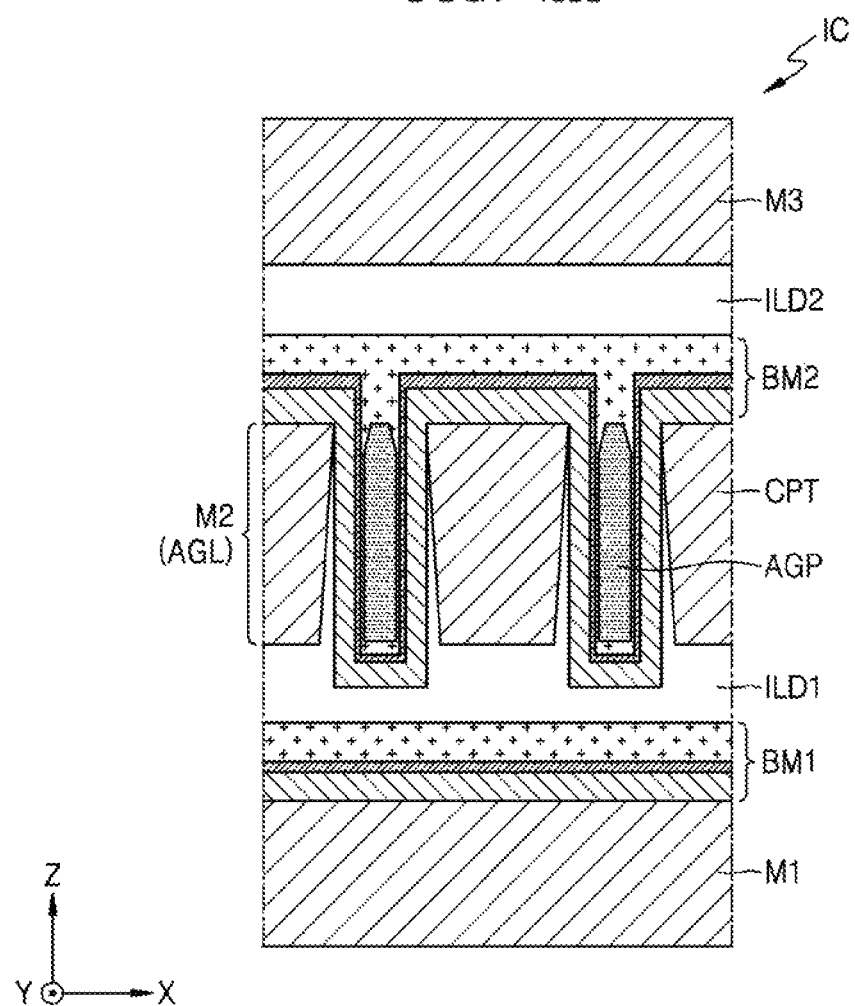
FIGS. 2A and 2B are cross-sectional views illustrating integrated circuits including an air-gap layer, respectively, according to an exemplary embodiment of the present inventive concept.

FIG. 2A is a cross-sectional view illustrating an integrated circuit IC including an air-gap layer according to an exemplary embodiment of the inventive concept.

Referring to FIG. 2A, the integrated circuit IC may include first to third wiring layers M1, M2, and M3, first and second insulation layers ILD1 and ILD2, and first and second barrier layers BM1 and BM2. The integrated circuit IC may be designed, for example, according to process S10 of FIG. 1, and may he manufactured, for example, according to process S20 of FIG. 1.

The first wiring layer M1 may extend in the X direction, the first barrier layer BM1 may include a plurality of barrier layers disposed on the first wiring layer M1, and the first insulation layer ILD1 may be disposed on the first barrier layer BM1. The second wiring layer M2 may be disposed on the first insulation layer ILD1 and extend in the Y direction, the second barrier layer BM2 may include a plurality of barrier layers disposed on the second wiring layer M2, and the second insulation layer ILD2 may be disposed on the second barrier layer BM2. The first and second insulation layers ILD1 and ILD2 may be referred to as interlayer dielectrics. The third wiring layer M3 is disposed on the second insulation layer ILD2 and extends in the X direction.

In an exemplary embodiment, one of the first to third wiring layers M1 to M3, which is to be allocated to an air-gap layer AGL, may be selected in advance. In an exemplary embodiment, a wiring layer that is to be allocated to the air-gap layer AGL may be selected based on the heights and/or the widths of the first to third wiring layers M1 to M3. For example, the wiring layer from among the first to third wiring layers M1 to M3 that has a relatively large height and/or width may have a relatively low resistance. This wiring layer may be selected as an air-gap layer. For example, the resistance of a lower-level wiring layer such as the first wiring layer M1 may be higher than the resistance of a higher-level wiring layer such as the third wiring layer M3. In an exemplary embodiment, a wiring layer that is to be allocated to the air-gap layer AGL may be selected based on the heights and/or the widths of the vias connecting the first to third wiring layers M1 to M3. For example, the resistance of the via of a lower-level wiring layer such as the first wiring layer M1 may be lower than the resistance of the via of a higher-level wiring layer such as the third wiring layer M3. In an exemplary embodiment, a wiring layer that is to be allocated as the air-gap layer AGL may be selected based on the heights and/or the widths of the first to third wiring layers M1 to M3 and the heights and/or the widths of the vias connecting the first to third wiring layers M1 to M3.

In an exemplary embodiment, the second wiring layer M2 may be allocated to an air-gap layer AGL including an air-gap pattern AGP, and the first and third wiring layers M1 and M3 may be allocated to normal layers that do not include an air-gap pattern AGP, as shown in FIG. 2A. In an exemplary embodiment, the second wiring layer M2 may be pre-routed with an air-gap layer AGL, and the first and third wiring layers M1 and M3 may be routed with a normal layer. Thus, the first to third wiring layers M1, M2, and M3 may be routed through a two-stage wiring scheme. In exemplary embodiments, the wiring layers pre-routed with the air-gap layer AGL may be pre-routed with the air-gap layer AGL before other layers are routed with the normal layer, or after other layers are routed with the normal layer.

According to an exemplary embodiment, the second wiring layer M2 may include conductive patterns CPTs extending in the Y direction, and air-gap patterns AGPs disposed between the conductive patterns CPTs. An air-gap pattern AGP may be generated by replacing an inter-metal dielectric (IMD) material between the conductive patterns CPTs with air. Because the dielectric coefficient of air is 1, which is a low value, the air-gap pattern AGP may decrease a parasitic capacitance between the conductive patterns CPTs, and accordingly, may improve an operational speed of a semiconductor chip including the integrated circuit IC. However, because process costs, such as mask costs, increase when generating an air-gap pattern AGP, manufacturing costs of the chip significantly increase when all of the first to third wiring layers M1, M2, and M3 included in the integrated circuit IC are implemented using air-gap layers.

Thus, according to an exemplary embodiment, all of the layers included in the integrated circuit IC (e.g., the first to third wiring layers M1, M2, and M3 in the exemplary embodiment shown in FIG. 2A) are not implemented using air-gap layers. Rather, only some layers (e.g., layers corresponding to a net of a timing critical path) such as, for example, only the second wiring layer M2 in the exemplary embodiment shown in FIG. 2A, may be implemented using an air-gap layer. Accordingly, improvement of the performance of the integrated circuit IC may be improved without significantly increasing manufacturing costs. For example, according to exemplary embodiments, an operational speed of a chip in which the integrated circuit IC is implemented may be improved to a level substantially equivalent to that of an integrated circuit in which all of the layers thereof are implemented using air-gap layers.

Figure 2B:
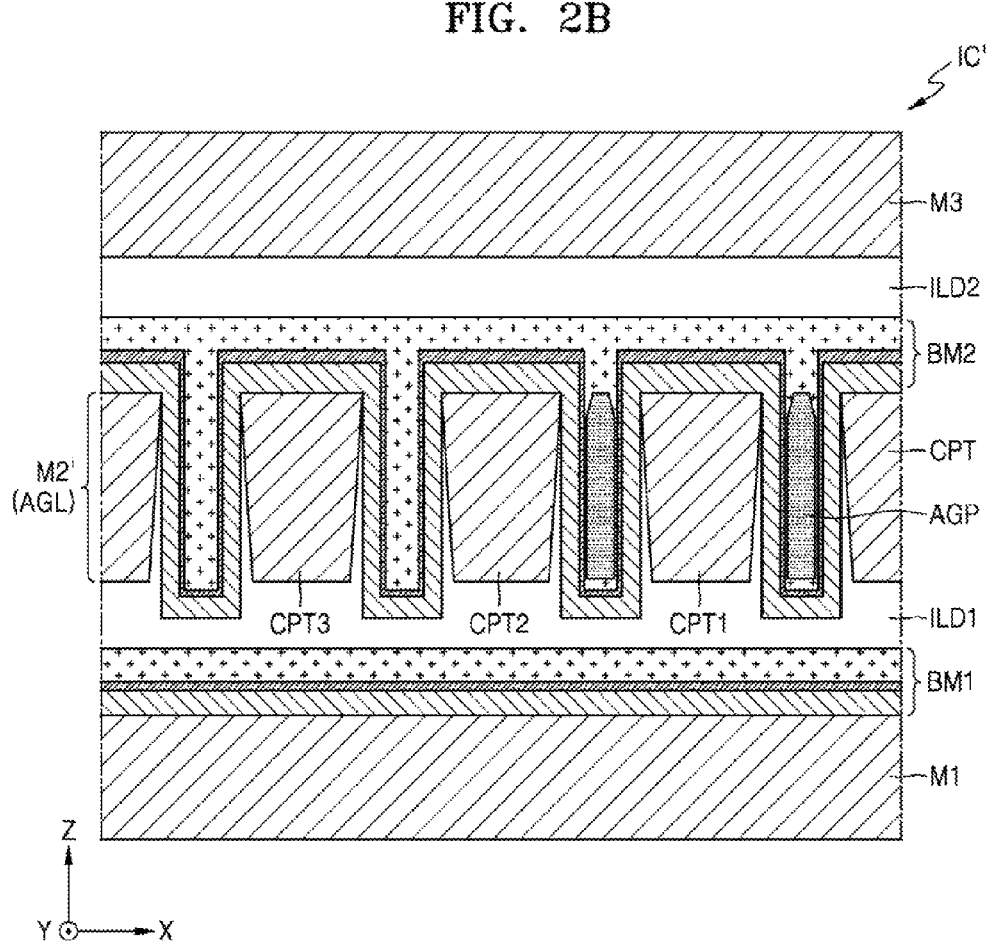

FIG. 2B is a cross-sectional view illustrating an integrated circuit IC' including an air-gap layer according to an exemplary embodiment of the inventive concept.

Referring to FIG. 2B, the integrated circuit IC' may include first to third wiring layers M1, M2', and M3, first and second insulation layers ILD1 and ILD2, and first and second barrier layers BM1 and BM2. The exemplary embodiment shown in FIG. 2B includes certain similarities to the exemplary embodiment shown in FIG. 2A. For convenience of explanation, a further detailed description of elements and configurations previously described with reference to FIG. 2A may be omitted herein. In an exemplary embodiment, the second wiring layer M2' may be allocated to an air-gap layer AGL including an air-gap pattern AGP, and the first and third wiring layers M1 and M3 may be allocated to general layers that do not include an air-gap pattern AGP.

According to an exemplary embodiment, the second wiring layer M2' may include conductive patterns CPT extending in the Y direction. For example, the conductive patterns CPT may include a first conductive pattern CPT1 having air-gap patterns AGP disposed on opposite side surfaces thereof, a second conductive pattern CPT2 having an air-gap pattern AGP disposed on one side surface thereof, and a third conductive pattern CPT3 that does not have an air-gap pattern AGP disposed on either opposite side surface thereof. Thus, the first and second conductive patterns CPT1 and CPT2 may be referred to as air-gap conductive patterns, and the third conductive pattern CPT3 may be referred to as a normal conductive pattern. Therefore, in an exemplary embodiment, one of the conductive patterns CPT included in the air-gap layer AGP (e.g., the second wiring layer M2' in the exemplary embodiment shown in FIG. 2B) may be implemented using an air-gap conductive pattern.

Referring back to FIG. 1, after operation S130, output data defining the integrated circuit may be provided to a semiconductor process device. Here, the output data may have a format including all layout information of standard cells. For example, the output data may include pattern information of all of the layers, and may have, for example, a graphic design system (GDS) II format. Further, the output data may have a format including external information of a standard cell such as, for example, a pin of a standard cell. For example, the output data may have a Library Exchange Format (LEF) or a MILKYWAY format.

As described above, according to an exemplary embodiment, routing may be performed by applying a two-stage wiring scheme to the arranged standard cells. For example, the routing for the arranged standard cells may include a first routing operation such as operation S120 and a second routing operation such as operation S130. For example, at least one net of a timing critical path from among a plurality of timing paths in the arranged standard cells may be allocated to an air-gap layer, and the remaining nets may be allocated to a normal layer. Accordingly, a high-performance integrated circuit may be manufactured by using a small number of air-gap layers.

The operation S10 of designing an integrated circuit may include the above-described operations S110 to S130. However, the inventive concept is not limited thereto. For example, in exemplary embodiments, operation S10 may include various operations relating to designing an integrated circuit such as, for example, generation of a standard cell library, correction of a standard cell library, and verification of a layout. Further, in an exemplary embodiment, operations S110 to S130 may correspond to a backend design process of an integrated circuit design process, and a frontend design process may be performed before operation S110. The frontend design process may include, for example, determination of a design specification, modeling and verification of an act level, designing of an RTL, verification of a function, synthesis of logic, and verification of a gate level (or simulation of a pre-layout).

In operation S140, a mask is generated based on a layout. For example, first, an optical proximity correction (OPC) may be performed based on the layout. The OPC refers to a process of changing a layout while reflecting an error according to an optical proximity effect. Subsequently, the mask may be manufactured according to the layout changed based on the OPC performance result. Then, the mask may be manufactured using a layout reflecting the OPC such as, for example, a GDS on which the OPC is reflected.

In operation S150, an integrated circuit is manufactured using the mask. For example, a semiconductor device in which an integrated circuit is implemented is formed by performing various semiconductor processes on a semiconductor substrate, such as a wafer, using the mask. The process using the mask may refer to, for example, a patterning process through a lithographic process. A desired pattern may be formed on a semiconductor substrate or a material layer through the patterning process. The semiconductor process may include, for example, a deposition process, an etching process, an ionizing process, and a cleaning process. The semiconductor process may further include, for example, a packaging process including mounting a semiconductor device on a printed circuit board (PCB) and sealing the semiconductor with a sealant. The semiconductor process may further include, for example, a test process of testing a semiconductor device or a package.

Figure 3:
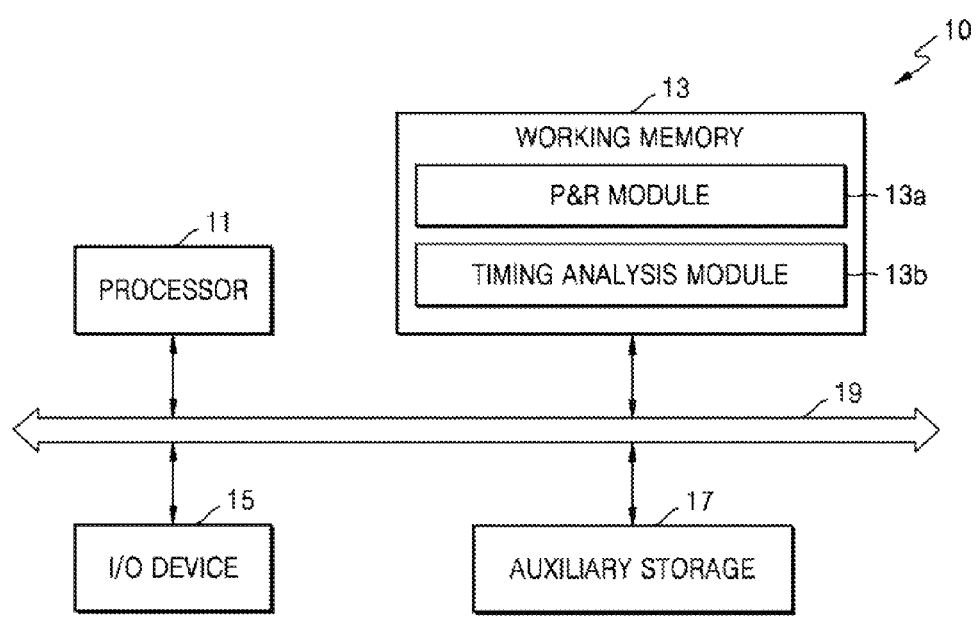
FIGS. 3 and 4 illustrate integrated circuit design systems, according to exemplary embodiments of the inventive concept.

FIG. 3 is an integrated circuit design system 10 according to an exemplary embodiment of the inventive concept.

Referring to FIG. 3, the integrated circuit design system 10 may include a processor 11, a working memory 13, an input/output device 15, an auxiliary storage 17, and a bus 19. The integrated circuit design system 10 may perform the integrated circuit design process S10 of FIG. 1. In an exemplary embodiment, the integrated circuit design system 10 may be implemented by an integrated device, and accordingly, may be referred to as an integrated circuit design apparatus. The integrated circuit design system 10 may be provided as a dedicated apparatus for designing an integrated circuit of a semiconductor device, and may be a computer for driving various simulation tools or design tools.

The processor 11 may be configured to execute instructions performing at least one of various operations for designing an integrated circuit. The processor 11 may perform communication with the working memory 13, the input/output device 15, and the auxiliary storage 17 through the bus 19. The processor 11 may execute an operation of designing the integrated circuit by driving a placement and routing (P&R) module 13a and a timing analysis module 13b loaded in the working memory 13. For example, the processor 11 may execute an operation of designing the integrated circuit by executing instructions stored in the memory relating to P&R and timing analysis.

The working memory 13 may store the P&R module 13a (e.g., instructions relating to P&R) and the timing analysis module 13b (e.g., instructions relating to timing analysis). The P&R module 13a and the timing analysis module 13b may be loaded from the auxiliary storage 17 to the working memory 13. The working memory 130 may be a volatile memory such as, for example, static random access memory (SRAM) or dynamic random access memory (DRAM), or may be a nonvolatile memory such as, for example, PRAM, MRAM, ReRAM, or a NOR flash memory.

The P&R module 13a may be, for example, a program including instructions for performing an arrangement operation according to operation S110 of FIG. 1, and a wiring operation according to operations S120 and S130 of FIG. 1.

The timing analysis module 13b may be, for example, a program including instructions for determining whether timing constraints are satisfied. Determining whether timing constraints are satisfied may include, for example, performing a timing analysis on all timing paths in the arranged standard cells. The timing analysis module 13b may refer to, for example, a static timing analysis (STA) tool.

The input/output device 15 may control user inputs from user interface devices, and outputs. The input/output device 15 may include an input device such as, for example, a keyboard, a mouse, or a touchpad, and may receive input data defining an integrated circuit. The input/output device 15 may include an output device such as, for example, a display or a speaker, and may display, for example, an arrangement result, a wiring result, or a timing analysis result.

The auxiliary storage 17 may store various data related to the P&R module 13a and the timing analysis module 13b. The auxiliary storage 17 may include, for example, a memory card (e.g., an MMC, an eMMC, an SD, a microSD, etc.), a solid state drive, and a hard disk drive.

Figure 4:
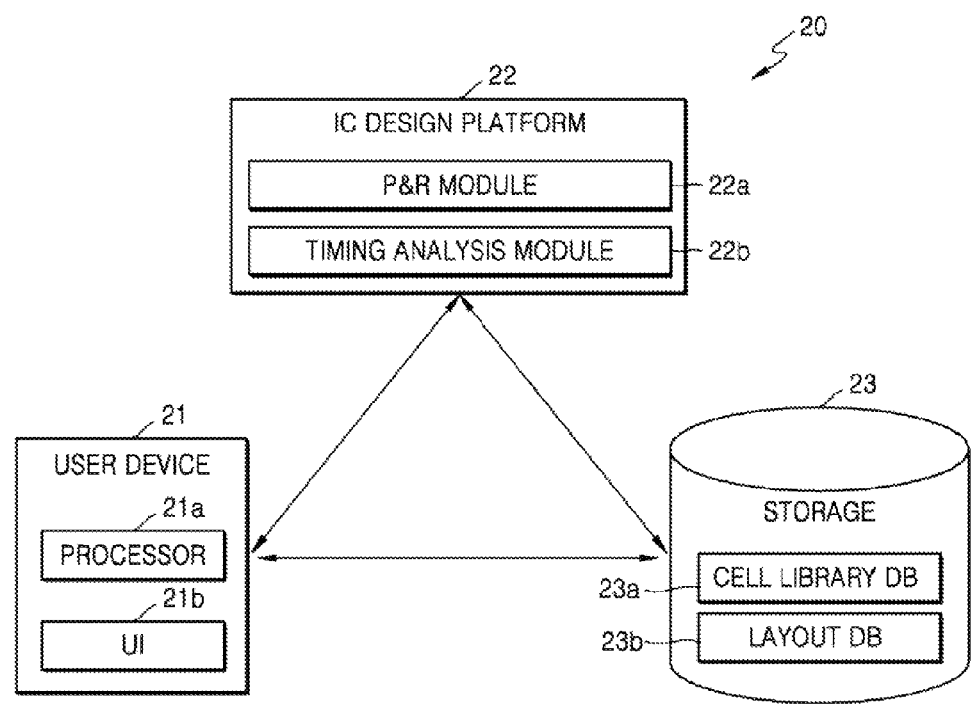

FIG. 4 is an integrated circuit design system 20 according to an exemplary embodiment of the inventive concept.

Referring to FIG. 4, the integrated circuit design system 20 may include a user device 21, an integrated circuit design platform 22, and an auxiliary storage 23. The integrated circuit design system 20 may perform the integrated circuit design operation S10 of FIG. 1. In an exemplary embodiment, at least one of the user device 21, the integrated circuit design platform 22, and the auxiliary storage 23 may be a separate device, and the user device 21, the integrated circuit design platform 22, and the auxiliary storage 23 may communicate with one another through a network via wired/wireless communication. In an exemplary embodiment, at least one of the user device 21, the integrated circuit design platform 22, and the auxiliary storage 23 may be disposed at a location different from the other components.

The user device 21 may include a processor 21a and a user interface (UI) 21b. The processor 21a may drive the integrated circuit design platform 22 according to a user input through the UI 21b. The integrated circuit design platform 22 is a set of computer-readable instructions for designing an integrated circuit, and may include a P&R module 22a (e.g., corresponding to instructions relating to P&R) and a timing analysis module 22b (e.g., corresponding to instructions relating to timing analysis). The auxiliary storage 23 may include a cell library database (DB) 23a and a layout DB 23b. The cell library DB 23a stores information relating to cells used for generating a layout of an integrated circuit, and the layout DB 23b stores information relating to a layout generated by the P&R module 22a (e.g., physical information of the layout).

Figure 5:
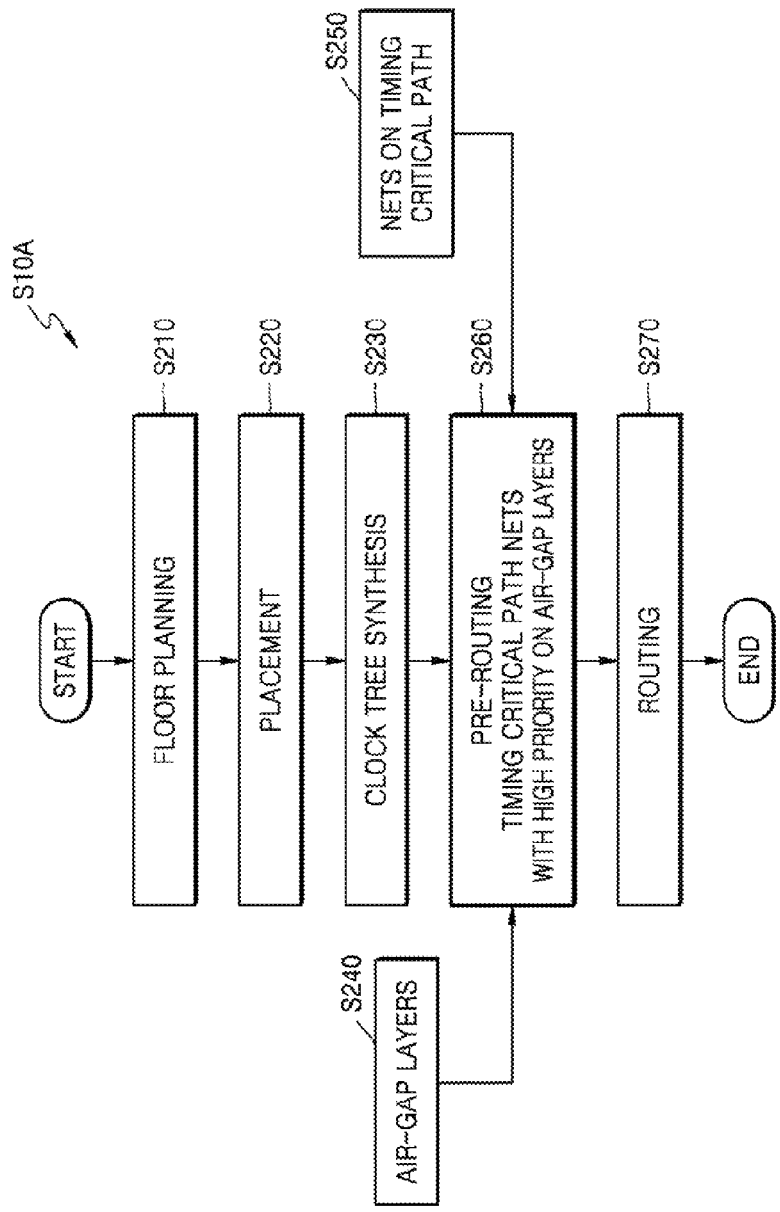
FIG. 5 is a flowchart illustrating a method of designing an integrated circuit, according to an exemplary embodiment of the inventive concept.

FIG. 5 is a flowchart illustrating a method S10A of designing an integrated circuit according to an exemplary embodiment of the inventive concept.

Referring to FIG. 5, the method S10A of designing an integrated circuit according to an exemplary embodiment may correspond to an implementation of the integrated circuit design operation S10 of FIG. 1. The method S10A of designing an integrated circuit may be performed, for example, by the processor 11 of the integrated circuit design system 10 of FIG. 3, or the processor 21a of the integrated circuit design system 20 of FIG. 4.

In operation S210, floor planning is performed. Floor planning is a placement planning stage, and refers to an operation of briefly planning the manner in which standard cells and macro cells will be placed/wired. For example, floor planning may include operations such as, for example, placing I/O pads, standard cells, RAM, etc. in the chip.

In operation S220, standard cells defining an integrated circuit are placed. Thereafter, a post-placement optimization may be performed. In operation S230, a clock tree synthesis is performed. Clock tree synthesis refers to an operation of automatically generating a clock network when a layout of a circuit is generated, and inserting a buffer at a suitable location. Once the standard cells are placed and the clock tree synthesis is performed in operations S220 and S230, placement of the standard cells is complete.

In operation S240, air-gap layers are selected. In an exemplary embodiment, a timing critical path of a plurality of timing paths included in the placed standard cells may be selected, and the timing critical path may be allocated to an air-gap layer. In operation S250, nets (also referred to hereinafter as timing critical nets) on the timing critical path are selected. In an exemplary embodiment, the nets included within a range of the timing critical path may be selected as timing critical nets. In exemplary embodiments, operation S240 and/or operation S250 may be performed during the placement operation S220. In exemplary embodiments, operation S240 and/or operation S250 may be performed during the pre-routing operation S260 and the routing operation S270.

In exemplary embodiments, the integrated circuit design method may further include an operation of re-selecting timing critical nets after operation S250. For example, some of the timing critical nets may be excluded from the air-gap layer target nets based on, for example, delays of the timing critical nets, physical conditions of the wiring layers corresponding to the timing critical nets, etc. These previously selected timing critical nets may be excluded via the re-selecting operation.

In an exemplary embodiment, a delay (e.g., a delay of air-gap conductive pattern routing) corresponding to a case in which the timing critical nets are routed using an air-gap conductive pattern (e.g., CPT1 or CPT2 of FIG. 2B) and a delay (e.g., a delay of normal-conductive pattern routing) corresponding to a case in which the timing critical nets are routed using a normal conductive pattern (e.g., CPT3 of FIG. 2B) may be compared, and timing critical nets may be re-selected based on the comparison result. For example, when a length of a first net of the selected timing critical nets is small (e.g., when the first net connects two connection points of the same wiring layer), a delay of air-gap conductive pattern routing for the first net may be larger than a delay of normal conductive pattern routing. Thus, the first net may be excluded from the selected timing critical nets (e.g., via the re-selection operation).

In an exemplary embodiment, it may be determined whether a space between a conductive pattern corresponding to a timing critical net and an adjacent conductive pattern is less than a threshold value, and timing critical nets may be re-selected based on the determination result. For example, in an exemplary embodiment, if a space near a conductive pattern corresponding to the first net of the selected timing critical nets is not less than a threshold value, the first net may be excluded from the selected timing critical nets (e.g., via the re-selection operation).

Further, in an exemplary embodiment, a location of the conductive pattern corresponding to the timing critical net may be determined, and the timing critical nets may be re-selected based on the determination result. For example, when the conductive pattern corresponding to the first net of the selected timing critical nets is situated at a distal end of the wiring layer, the first net may be excluded from the selected timing critical nets (e.g., via the re-selection operation).

In operation S260, the timing critical nets are pre-routed with high priority on the air-gap layers. In operation S270, nets (also referred to hereinafter as unselected nets) of a non-critical path of the timing paths in the placed standard cells are routed. In this way, according to an exemplary embodiment, in the method S10A of designing an integrated circuit, a high performance integrated circuit may be implemented by using a small number of air-gap layers by applying a two-stage wiring scheme, in which nets included in timing critical paths are pre-routed with a relatively high priority on air-gap layers, and in which nets of non-critical paths are routed with a relatively low priority without air-gap layers.

Figure 6:
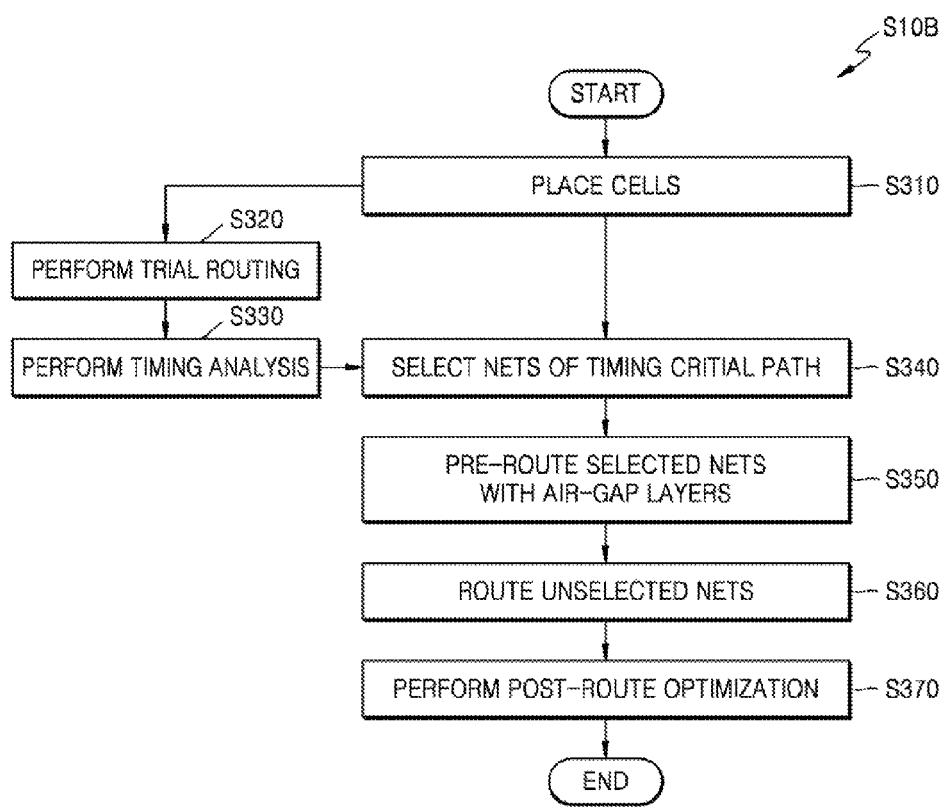
FIG. 6 is a flowchart illustrating a method of designing an integrated circuit, according to an exemplary embodiment of the inventive concept.

FIG. 6 is a flowchart illustrating a method S10B of designing an integrated circuit, according to an exemplary embodiment of the inventive concept.

Referring to FIG. 6, the method S10B of designing an integrated circuit according to an exemplary embodiment may correspond to an implementation of the integrated circuit design process S10A of FIG. 5. The method S10B of designing an integrated circuit may be performed, for example, by the processor 11 of the integrated circuit design system 10 of FIG. 3, or the processor 21a of the integrated circuit design system 20 of FIG. 4.

In operation S310, a plurality of standard cells that define an integrated circuit are placed. Operation S310 may be performed, for example, using a P&R tool (e.g., component 13a of FIG. 3 or component 22a of FIG. 4). In an exemplary embodiment, operation S310 may correspond to operation S220 of FIG. 5. Further, in an exemplary embodiment, operation S310 may correspond to operations S220 and S230 of FIG. 5.

In operation S320, the placed standard cells may be trial-routed. Here, trial routing refers to routing for sorting timing critical paths. However, the present inventive concept is not limited thereto. For example, operation S320 may be omitted in exemplary embodiments. For example, when a timing analysis is enabled only by placement information of the standard cells by operation S310, operation S320 may be omitted. In operation S330, a timing analysis is performed. For example, a timing analysis may be performed to select a timing critical path of a plurality of timing paths in the placed standard cells, and timing analysis result data may be provided. For example, in operation S330, a timing critical path from among a plurality of timing paths included in the placed standard cells may be selected based on the timing analysis result data obtained by performing timing analysis. In addition, at least one net may be selected as a timing critical net based on the timing analysis result data.

The timing paths may be classified into, for example, data paths, clock paths, clock gating paths, and asynchronous paths. Each of the timing paths has a start point and an end point. The timing paths may refer to, for example, combinational logic and interconnections between parts of an integrated circuit such as, for example, between an input pad and an output pad, between an input pad and a data input of a flip-flop, between a data output of a flip-flop and a data input of another flip-flop, and between a data output of a flip-flop and an output pad. A delay through a timing path may have a great effect on an operational speed of an integrated circuit.

A timing critical path may refer to a timing path in which the total timing delay from an input (e.g., a start point) to an output (e.g., an end point) exceeds a timing constraint. Timing paths in which the total timing delay from an input (e.g., a start point) to an output (e.g., an end point) that do not exceed the timing constraint may be referred to as non-critical paths. In an exemplary embodiment, a timing critical path may refer to a timing path having a maximum delay. Hereinafter, a timing analysis will be described in more detail with reference to FIG. 7.

Figure 7:
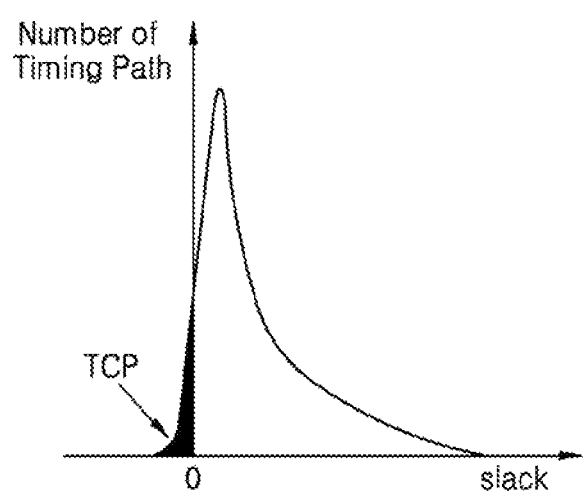
FIG. 7 is a graph depicting a timing analysis result, according to an exemplary embodiment of the inventive concept.

FIG. 7 is a graph depicting a timing analysis result according to an exemplary embodiment of the inventive concept.

Referring to FIG. 7, the transverse axis represents a slack and the longitudinal axis represents the number of timing paths. Here, a slack represents a difference between a time required for a timing requirement and an actual arrival time, and may be measured by a timing analyzer or a timing analysis module (for example, component 13b of FIG. 3 or component 22b of FIG. 4). A positive slack indicates that a timing violation has not occurred (e.g., a time requirement is satisfied), and a negative slack indicates that a timing violation has occurred (e.g., a timing requirement is not satisfied). Accordingly, the timing paths corresponding to a negative slack in FIG. 7 may correspond to timing critical paths (TCPs).

Referring back to FIG. 6, in operation S340, nets of a timing critical path are selected. For example, at least one of a plurality of nets included in a timing critical path may be selected by applying the analysis data acquired in operation S330 to the standard cells placed in operation S310 (e.g., by applying the analysis data to a state before the trial routing of operation S320 is performed). For example, nets corresponding to a specific range of a timing critical path may be selected. Thus, in operation S340, at least one net from among a plurality of nets included in a timing critical path may be selected. This selected at least one net may be referred to as at least one timing critical net of the timing critical path.

In operation S350, the selected nets are pre-routed with an air-gap layer. In an exemplary embodiment, a selected net may correspond to a first conductive pattern included in a first wiring layer, a via electrically connected to the first conductive pattern, and a second conductive pattern included in a second wiring layer and electrically connected to the via. In an exemplary embodiment, the selected net may be routed by two air-gap layers by disposing air-gap patterns on opposite sides of the first conductive pattern, and by disposing air-gap patterns on opposite sides of the second conductive pattern. Hereinafter, operation S350 will be described in more detail with reference to FIGS. 8 and 9A to 9C.

Figure 8:
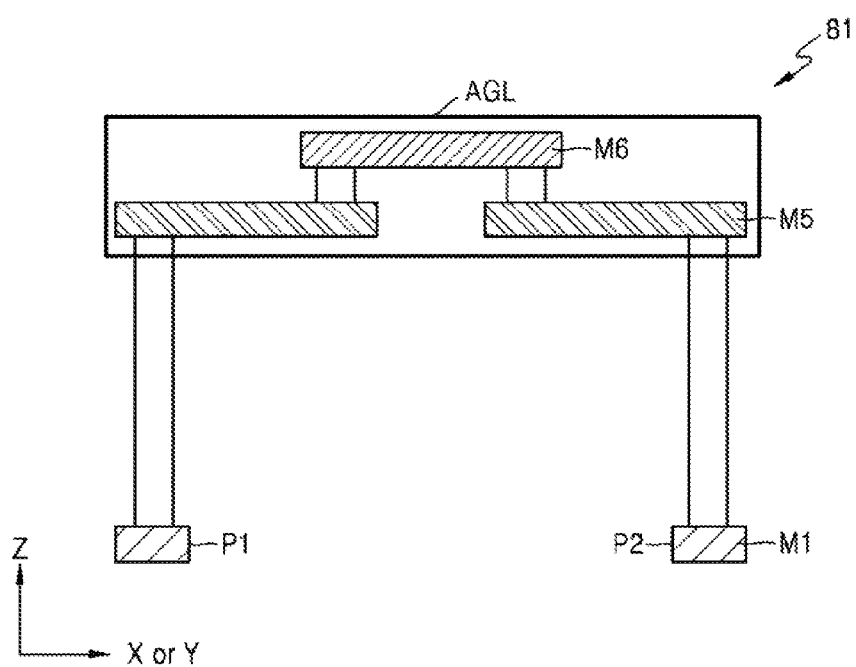
FIG. 8 illustrates a wiring structure routed using an air-gap layer, according to an exemplary embodiment of the inventive concept.

FIG. 8 illustrates a wiring structure 81 routed using an air-gap layer AGL according to an exemplary embodiment of the inventive concept.

Referring to FIG. 8, the wiring structure 81 corresponds to a timing critical path. In the wiring structure 81, only fifth and sixth wiring layers M5 and M6 corresponding to some areas of the wiring structure 81 are routed with the air-gap layer AGL. The fifth and six wiring layers M5 and M6 may correspond to a selected net (e.g., a timing critical net) of the timing critical path. The first wiring layer M1 may include first and second pins P1 and P2. The first and second pins P1 and P2 may correspond to, for example, an input pin (e.g., a start point) and an output pin (e.g., an end point) of the timing critical path.

The timing critical path is one of the timing paths in the placed standard cells that does not satisfy timing constraints. As a result, a parasitic capacitance between the conductive patterns of the timing critical path may significantly influence the performance (e.g., the operational speed) of an integrated circuit and a chip including the integrated circuit. According to an exemplary embodiment, the selected net (e.g., the timing critical net) included in the timing critical path is pre-routed with an air-gap layer. Pre-routing the selected net with the air-gap layer includes, for example, disposing air-gap patterns on opposite sides of a wiring layer corresponding to the selected net.

According to an exemplary embodiment, as a result of pre-routing the selected net of the timing critical path with an air-gap layer, a parasitic capacitance between the conductive patterns corresponding to the selected net of the timing critical path may decrease. Accordingly, the timing delay of the timing critical path may decrease, resulting in the timing critical path satisfying the timing constraints. As a result, the operational speed of the integrated circuit and the chip including the integrated circuit may be improved.

FIGS. 9A to 9E are perspective views illustrating timing critical nets routed with an air-gap layer according to exemplary embodiments of the inventive concept. The timing critical nets exemplified in FIGS. 9A and 9C-9E may correspond, for example, to the fifth and sixth wiring layers M5 and M6 of FIG. 8. The timing critical nets exemplified in FIG. 9B may include fifth and eighth wiring layers M5 and M8, as described further below.

Figure 9A:
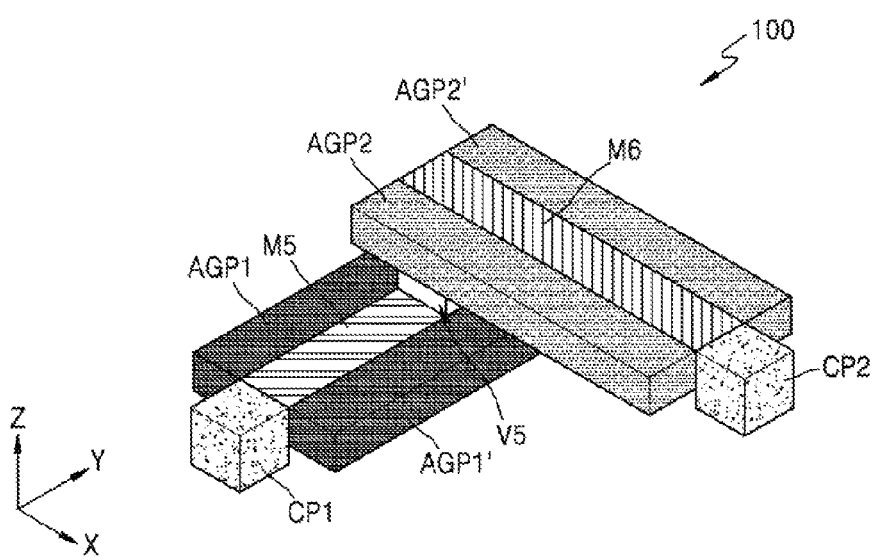
FIGS. 9A to 9E are perspective views illustrating timing critical nets routed with an air-gap layer, according to an exemplary embodiment of the inventive concept.

Referring to FIG. 9A, a bidirectional air-gap layer may be disposed on consecutive metal layers (e.g., consecutive wiring layers). For example, a bidirectional air-gap layer including air-gap patterns AGP1, AGP1', AGP2 and AGP2' may be disposed on consecutive fifth and sixth wiring layers M5 and M6. In FIG. 9A, a timing critical net 100 may be a net connecting a first connection point CP1 and a second connection point CP2. The timing critical net 100 may include the fifth wiring layer M5 electrically connected to the first connection point CP1, a via V5 disposed on the fifth wiring layer M5 and electrically connected to the fifth wiring layer M5, and the sixth wiring layer M6 disposed on the via V5 and electrically connected to the via V5 and the second connection point CP2. The fifth wiring layer M5 may extend in the Y direction, and the sixth wiring layer M6 may extend in the X direction. Throughout the figures, the X direction and the Y direction may be substantially perpendicular to each other. The fifth and sixth wiring layers M5 and M6 may correspond to, for example, the fifth and sixth wiring layers M5 and M6 of FIG. 8, respectively.

In the exemplary embodiment of FIG. 9A, both the fifth and sixth wiring layers M5 and M6 may be implemented by air-gap layers. For example, air-gap patterns AGP1 and AGP1' may be disposed on opposite sides of the fifth wiring layer M5, and air-gap patterns AGP2 and AGP2' may be disposed on opposite sides of the sixth wiring layer M6. However, the inventive concept is not limited thereto. For example, in exemplary embodiments, an air-gap pattern may be disposed on only one side of the fifth wiring layer M5 and an IMD including a general dielectric material may be disposed on an opposite side of the fifth wiring layer M5. Similarly, an air-gap pattern may be disposed on only one side of the sixth wiring layer M6, and an IMD including a general dielectric material may be disposed on an opposite side of the sixth wiring layer M6.

Figure 9B:
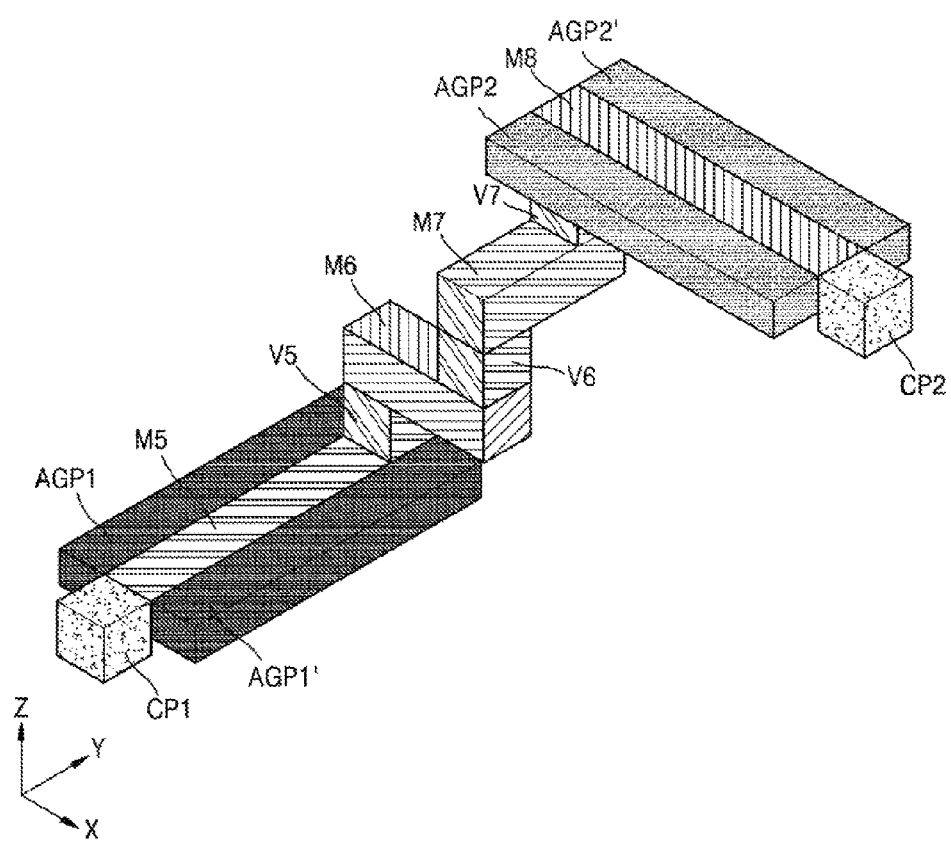

In an exemplary embodiment, the air-gap patterns AGP1 and AGP1' may extend in the Y direction and the air-gap patterns AGP2 and AGP2' may be extend in the X direction. According to exemplary embodiments, the timing critical net 100 may be implemented by a bidirectional air-gap layer including air-gap patterns extending in two different directions, as shown in FIG. 9A. In addition, according to exemplary embodiments, the air-gap patterns may be disposed on two consecutive wiring layers in the Z direction as shown in FIGS. 9A and 9C to 9E, or on two non-consecutive wiring layers in the Z direction as shown in FIG. 9B. For example, in exemplary embodiments, the fifth and sixth wiring layers M5 and M6 are two consecutive wiring layers adjacent (e.g., directly adjacent) to each other in the Z direction, and are implemented by air-gap layers, as shown in FIGS. 9A and 9C to 9E. Thus, according to exemplary embodiments, as a result of the utilization of the bidirectional air-gap layer, an air-gap volume may be increased regardless of the locations of the first and second connection points CP1 and CP2 of the timing critical net 100. As a result, performance gain of the integrated circuit may be increased. In exemplary embodiments, the air-gap volume may become about 100% regardless of the locations of the first and second connection points CP1 and CP2 of the timing critical net 100 as a result of the utilization of the bidirectional air-gap layer.

Referring to FIG. 9B, a bidirectional air-gap layer may be disposed on non-consecutive metal layers (e.g., non-consecutive wiring layers). For example, a bidirectional air-gap layer including air-gap patterns AGP1, AGP1', AGP2 and AGP2' may be disposed on non-consecutive fifth and eighth wiring layers M5 and M8. Intervening wiring layers M6 and M7 may be disposed between the non-consecutive fifth and eighth wiring layers M5 and M8. In FIG. 9B, a timing critical net 100 may be a net connecting a first connection point CP1 and a second connection point CP2. The timing critical net 100 may include the fifth wiring layer M5 electrically connected to the first connection point CP1, a via V5 disposed on the fifth wiring layer M5 and electrically connected to the fifth wiring layer M5, the sixth wiring layer M6 disposed on the via V5 and electrically connected to the via V5, a via V6 disposed on the sixth wiring layer M6 and electrically connected to the sixth wiring layer M6, the seventh wiring layer M7 disposed on the via V6 and electrically connected to the via V6, a via V7 disposed on the seventh wiring layer M7 and electrically connected to the via V7, and the eighth wiring layer M8 disposed on the via V7 and electrically connected to the via V7 and the second connection point CP2.

The fifth and seventh wiring layers M5 and M7 may extend in the Y direction, and the sixth and eighth wiring layers M6 and M8 may extend in the X direction. Throughout the figures, the X direction and the Y direction may be substantially perpendicular to each other.

In the exemplary embodiment of FIG. 9B, both the fifth and eighth wiring layers M5 and M8, which are non-consecutive wiring layers, may be implemented by air-gap layers. For example, air-gap patterns AGP1 and AGP1' may be disposed on opposite sides of the fifth wiring layer M5, and air-gap patterns AGP2 and AGP2' may be disposed on opposite sides of the eighth wiring layer M8. However, the inventive concept is not limited thereto. For example, in exemplary embodiments, an air-gap pattern may be disposed on only one side of the fifth wiring layer M5 and an IMD including a general dielectric material may be disposed on an opposite side of the fifth wiring layer M5. Similarly, an air-gap pattern may be disposed on only one side of the eighth wiring layer M8, and an IMD including a general dielectric material may be disposed on an opposite side of the eighth wiring layer M8.

In an exemplary embodiment, the air-gap patterns AGP1 and AGP1' may extend in the Y direction and the air-gap patterns AGP2 and AGP2' may extend in the X direction. According to exemplary embodiments, the air-gap patterns may be disposed on two non-consecutive wiring layers in the Z direction as shown in FIG. 9B. For example, in exemplary embodiments, the fifth and eighth wiring layers M5 and M8 are two non-consecutive wiring layers that are not adjacent (e.g., not directly adjacent) to each other in the Z direction, and are implemented by air-gap layers, as shown in FIG. 9B.

Figure 9C:
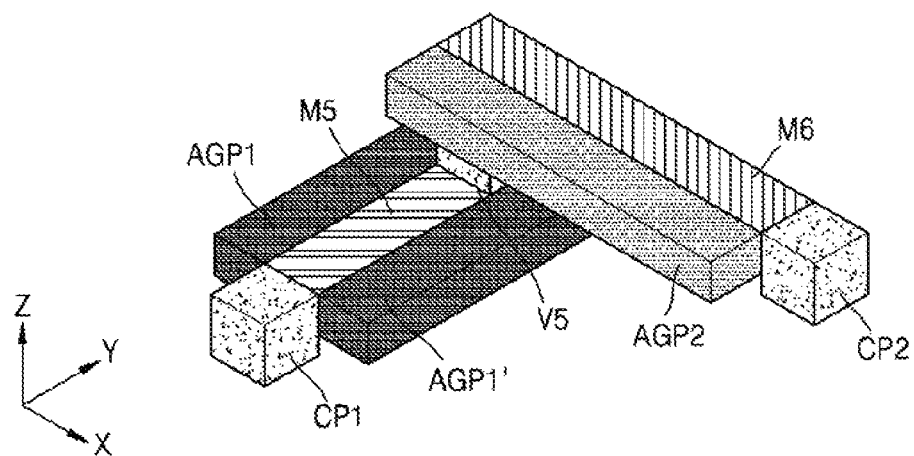
Figure 9D:
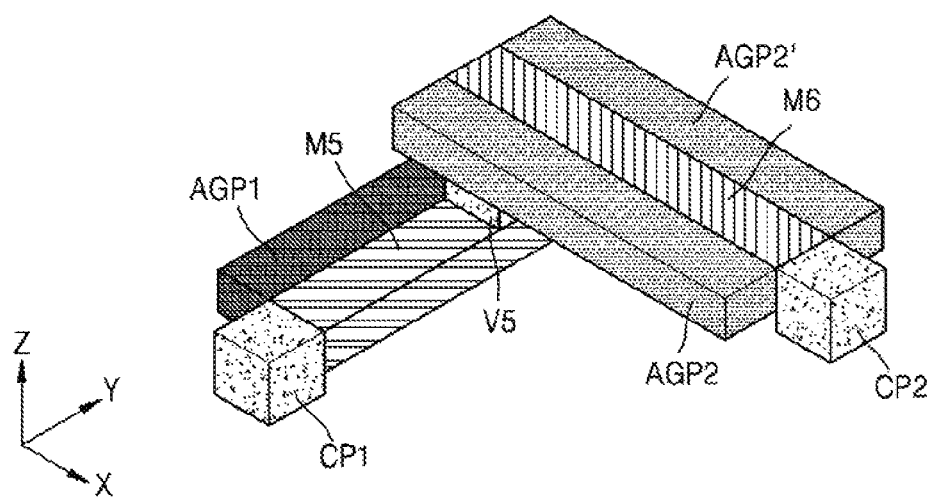
Figure 9E:
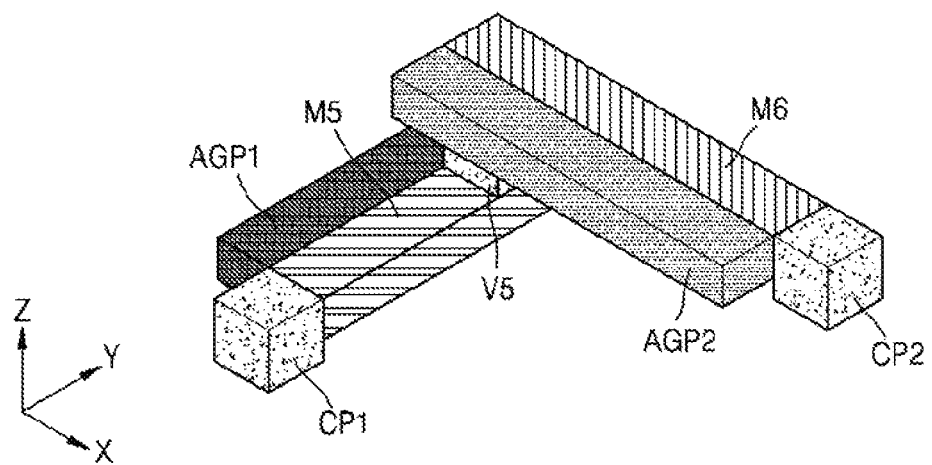

Referring to FIGS. 9C to 9E, an air-gap pattern may be disposed on only one side of the fifth and/or sixth wiring layers M5 and M6. An IMD including a general dielectric material may be disposed on an opposite side of the fifth and/or sixth wiring layers M5 and M6 on which an air-gap pattern is disposed on only one side thereof. For example, in the exemplary embodiment of FIG. 9C, a bidirectional air-gap layer may include air-gap patterns AGP1 and AGP1' disposed on opposite sides of the fifth wiring layer M5, and air-gap pattern AGP2 disposed on only one side of the sixth wiring layer M6. An IMD including a general dielectric material may be disposed on the side of the sixth wiring layer M6 that does not include an air-gap pattern disposed adjacent thereto. In the exemplary embodiment of FIG. 9D, a bidirectional air-gap layer may include air-gap patterns AGP2 and AGP2' disposed on opposite sides of the sixth wiring layer M6, and air-gap pattern AGP1 disposed on only one side of the fifth wiring layer M5. An IMD including a general dielectric material may be disposed on the side of the fifth wiring layer M5 that does not include an air-gap pattern disposed adjacent thereto. In the exemplary embodiment of FIG. 9E, a bidirectional air-gap layer may include air-gap pattern AGP1 disposed on only one side of the fifth wiring layer M5, and air-gap pattern AGP2 disposed on only one side of the sixth wiring layer M6. An IMD including a general dielectric material may be disposed on the side of the fifth wiring layer M5 and the sixth wiring layer M6 that does not include an air-gap pattern disposed adjacent thereto.

As described with reference to FIGS. 9A to 9E, pre-routing the selected net (e.g., the timing critical net) may be performed in various manners. For example, the number of air-gap layers and/or the number of air-gap patterns may be variably determined according to the magnitude of a slack, based on the timing analysis result. Further, the number of air-gap layers and/or the number of air-gap patterns may be variably determined in consideration of other constraints such as, for example, power constraints or area constraints, as well as timing constraints. A plurality of selected nets (e.g., timing critical nets) may be pre-routed with air-gap layers in the manner described above.

Referring back to FIG. 6, in operation S360, the unselected nets are routed. In an exemplary embodiment, the unselected nets may include nets included in non-critical paths from among the plurality of timing paths in the standard cells. In addition, the unselected nets may include nets included in the timing critical path other than the nets selected in operation S340. For example, within a timing critical path, some nets may be selected as timing critical nets and may be pre-routed with an air-gap layer, and other nets may not be selected and may be routed without an air-gap layer (e.g., routed with a layer that does not include an air-gap pattern). The unselected nets may also be referred to as non-critical nets.

In an exemplary embodiment, the unselected net may correspond to a first conductive pattern included in the first wiring layer, a via electrically connected to the first conductive pattern, and a second conductive pattern included in the second wiring layer and electrically connected to the via. The unselected net may be routed without an air-gap layer. For example, the unselected net may be routed by disposing a general dielectric material on opposite sides of each of the first and second conductive patterns, instead of disposing air-gap patterns on opposite sides of each of the first and second conductive patterns. However, the inventive concept is not limited thereto. For example, in exemplary embodiments, at least one of the unselected nets may be routed with an air-gap layer. For example, the number or the lengths of the timing critical paths may be relatively small (e.g., smaller than a predetermined threshold), and the number of the nets included in the timing critical path may also be relatively small (e.g., smaller than a predetermined threshold). As a result, the number of nets selected in operation S340 may be small. In this case, when a resource of an air-gap layer remains, at least one of the unselected nets in operation S360 may be routed with an air-gap layer.

Hereinafter, operation S360 will be described in more detail with reference to FIG. 10.

Figure 10:
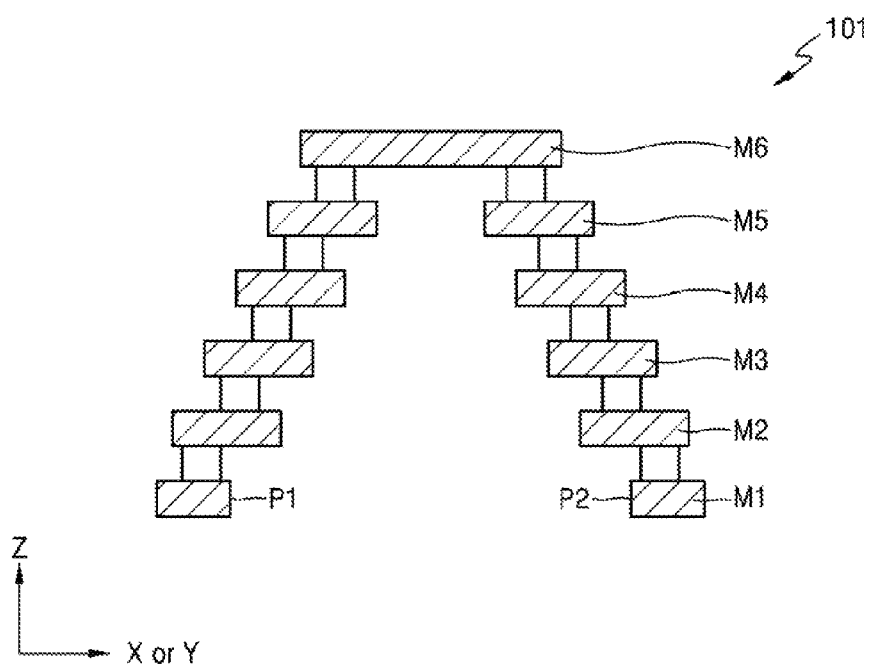
FIG. 10 illustrates a wiring structure routed using a normal layer, according to an exemplary embodiment of the inventive concept.

FIG. 10 illustrates a wiring structure 101 routed using a normal layer according to an exemplary embodiment of the inventive concept.

Referring to FIG. 10, the wiring structure 101 may correspond to a non-critical path, and the first to sixth wiring layers M1 to M6 included in the wiring structure 101 may be routed with a normal layer (e.g., routed without an air-gap layer). The first wiring layer M1 may include first and second pins P1 and P2. The first and second pins P1 and P2 may correspond to, for example, an input pin (e.g., a start point) and an output pin (e.g., an end point) of the non-critical path, respectively.

The non-critical path is one of the timing paths in the placed standard cells that satisfies timing constraints. Accordingly, a parasitic capacitance between the conductive patterns of the non-critical path may not significantly influence performance (e.g., operational speeds) of an integrated circuit and a chip including the integrated circuit. Therefore, according to an exemplary embodiment, the nets included in the non-critical path may be routed by a normal layer instead of an air-gap layer. For example, IMDs including a general dielectric material may be disposed on opposite sides of a wiring layer corresponding to the nets included in the non-critical path (e.g., instead of disposing air-gap patterns on opposite sides thereof).

According to exemplary embodiments of the inventive concept, the number of air-gap layers used when manufacturing an integrated circuit that includes air-gap layers may be reduced by pre-routing selected nets of timing critical paths with an air-gap layer, and by routing unselected nets (e.g., nets of non-critical paths and/or unselected nets of timing critical paths) with a normal layer (e.g., using IMDs including a general dielectric material) instead of with an air-gap layer. Accordingly, manufacturing costs of the integrated circuit may be reduced, and the operational speed of an integrated circuit and a chip including the integrated circuit may be improved.

Referring back to FIG. 6 in operation S370, post-routing optimization is performed. The post-routing optimization fixes violations of timings and/or design rules that may be present after the routing is complete. After the post-routing optimization, a final layout may be generated by performing engineering change orders (ECO) routing and reflecting any changes in a netlist.

Figure 11A:
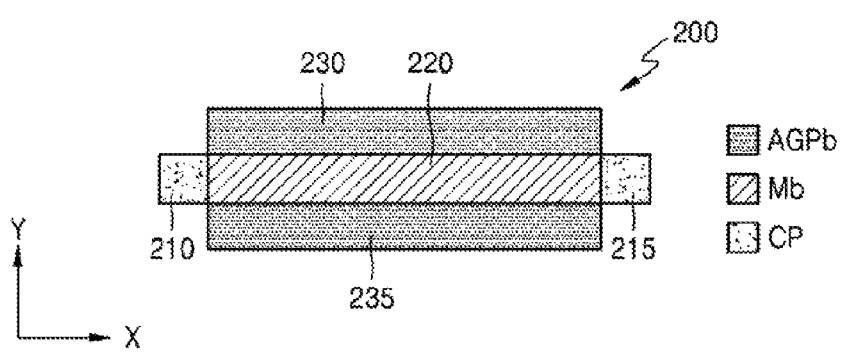
FIG. 11A is a plan view illustrating an integrated circuit routed by applying an air-gap pattern, according to an exemplary embodiment of the inventive concept.
Figure 11B:
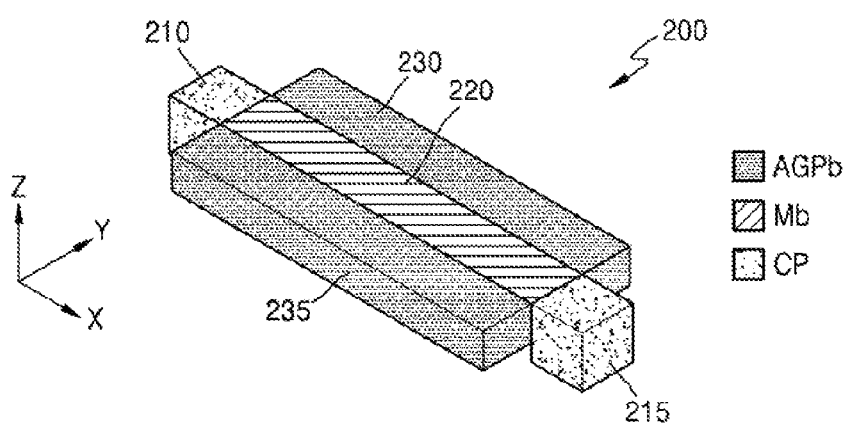
FIG. 11B is a perspective view illustrating the integrated circuit of FIG. 11A, according to an exemplary embodiment of the inventive concept.

FIG. 11A is a plan view illustrating an integrated circuit 200 routed by applying an air-gap pattern according to an exemplary embodiment of the inventive concept. FIG. 11B is a perspective view illustrating the integrated circuit 200 of FIG. 11A according to an exemplary embodiment of the inventive concept.

Referring to FIGS. 11A and 11B, the integrated circuit 200 may correspond to one net including first and second connection points 210 and 215 (denoted by CP in FIGS. 11A and 11B) and a conductive pattern 220 (denoted by Mb in FIGS. 11A and 11B). The first and second connection points 210 and 215 may be disposed in the same layer, and the Y coordinates thereof may be the same and the X coordinates thereof may be different. The integrated circuit 200 may include, for example, the conductive pattern 220 disposed between the first and second connection points 210 and 215, and air-gap patterns 230 and 235 (denoted by AGPb in FIGS. 11A and 11B) disposed on opposite sides of the conductive pattern 220.

In an exemplary embodiment, the conductive pattern 220 may correspond to a timing critical path. Accordingly, air-gap patterns 230 and 235 may be disposed on opposite sides of the conductive pattern 220. The conductive pattern 220 may extend in the X direction, and accordingly, the air-gap patterns 230 and 235 also may extend in the X direction. The conductive pattern 220 may correspond to, for example, the fifth or sixth wiring layer M5 or M6 of FIG. 8.

Figure 12A:
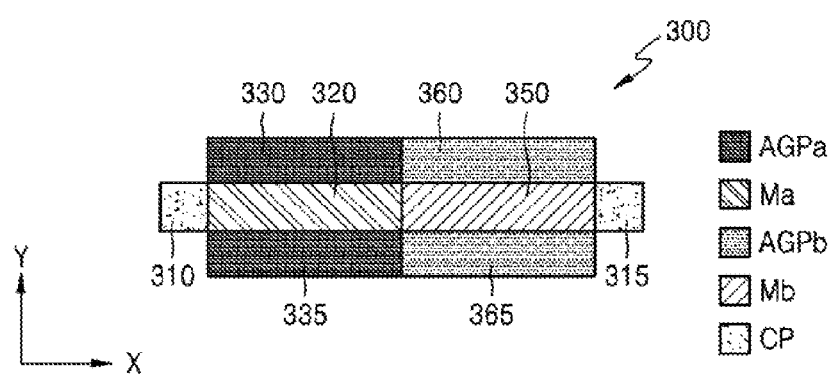
FIG. 12A is a plan view illustrating an integrated circuit routed by applying an air-gap pattern, according to an exemplary embodiment of the inventive concept.
Figure 12B:
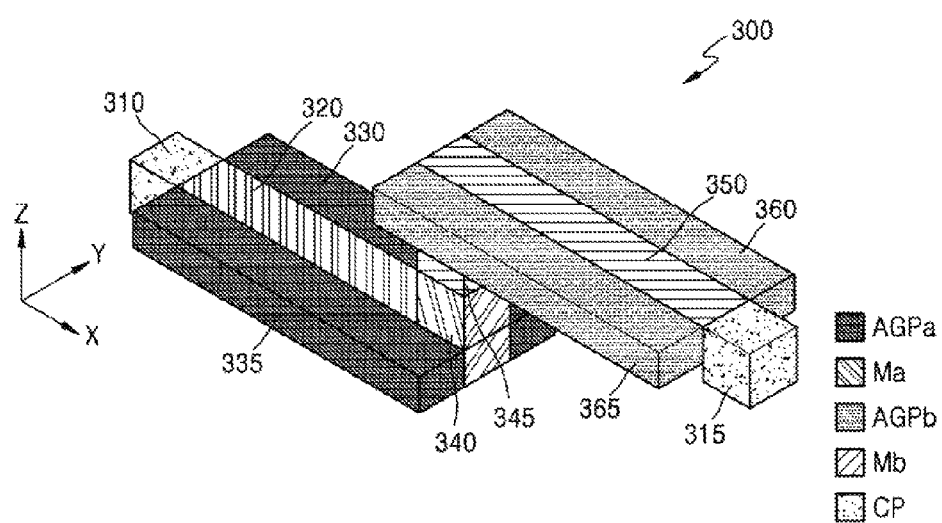
FIG. 12B is a perspective view illustrating the integrated circuit of FIG. 12A, according to an exemplary embodiment of the inventive concept.

FIG. 12A is a plan view illustrating an integrated circuit 300 routed by applying an air-gap pattern according to an exemplary embodiment of the inventive concept. FIG. 12B is a perspective view illustrating the integrated circuit 300 of FIG. 12A according to an exemplary embodiment of the inventive concept.

Referring to FIGS. 12A and 12B, the integrated circuit 300 may correspond to one net including first and second connection points 310 and 315 (denoted by CP in FIGS. 12A and 12B) and first and second conductive patterns 320 and 350 (denoted by Ma and Mb, respectively, in FIGS. 12A and 12B). The first and second connection points 310 and 315 may be disposed in different layers, and the Y coordinates thereof may be the same and the X coordinates thereof may be different. The integrated circuit 300 may include, for example, a first conductive pattern 320 connected to the first connection point 310, first and second vias 340 and 345 disposed on the first conductive pattern 320, a second conductive pattern 350 disposed on the second via 345, first air-gap patterns 330 and 335 (denoted by AGPa in FIGS. 12A and 12B) disposed on opposite sides of the first conductive pattern 320, and second air-gap patterns 360 and 365 (denoted by AGPb in FIGS. 12A and 12B) disposed on opposite sides of the second conductive pattern 350.

In an exemplary embodiment, the first and second conductive patterns 320 and 350 may correspond to a timing critical path. Accordingly, the first air-gap patterns 330 and 335 may be disposed on opposite sides of the first conductive pattern 320, and the second air-gap patterns 360 and 365 may be disposed on opposite sides of the second conductive pattern 350. The first conductive pattern 320 may extend in the X direction, and accordingly, the first air-gap patterns 330 and 335 also may extend in the X direction. The second conductive pattern 350 may extend in the X direction, and accordingly, the second air-gap patterns 360 and 365 also may also extend in the X direction. The first and second conductive patterns 320 and 350 may correspond to, for example, the fifth and sixth wiring layers M5 and M6 of FIG. 8, respectively.

Figure 13A:
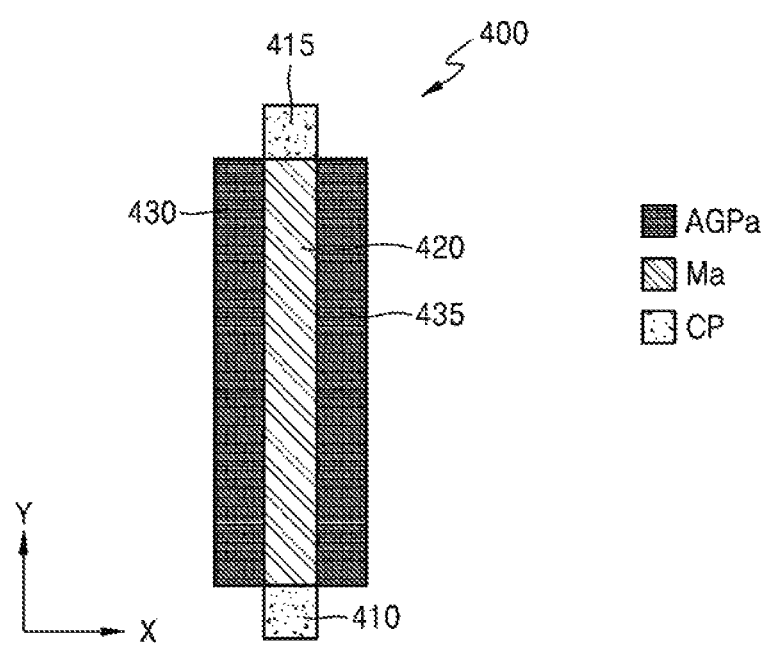
FIG. 13A is a plan view illustrating an integrated circuit routed by applying an air-gap pattern, according to an exemplary embodiment of the inventive concept.
Figure 13B:
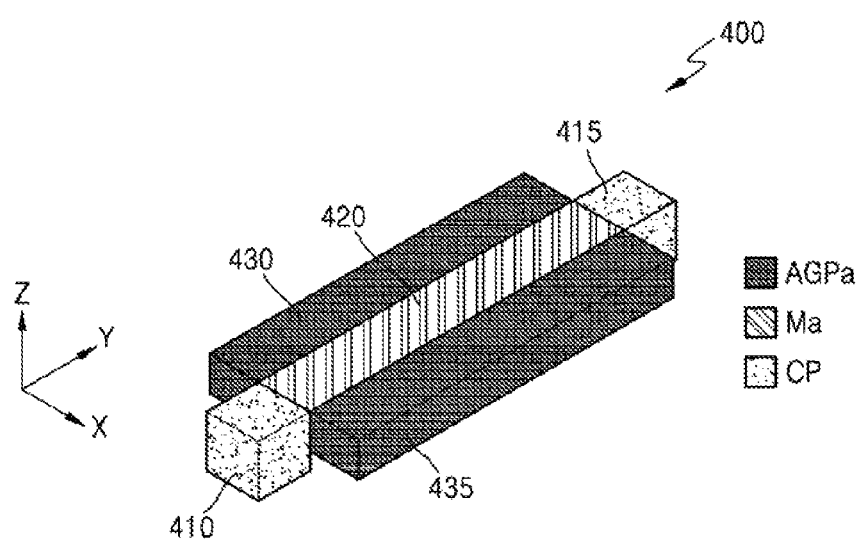
FIG. 13B is a perspective view illustrating the integrated circuit of FIG. 13A, according to an exemplary embodiment of the inventive concept.

FIG. 13A is a plan view illustrating an integrated circuit 400 routed by applying an air-gap pattern according to an exemplary embodiment of the inventive concept. FIG. 13B is a perspective view illustrating the integrated circuit 400 of FIG. 13A according to an exemplary embodiment of the inventive concept.

Referring to FIGS. 13A and 13B, the integrated circuit 400 may correspond to one net including first and second connection points 410 and 415 (denoted by CP in FIGS. 13A and 13B) and a conductive pattern 420 (denoted by Ma in FIGS. 13A and 13B). The first and second connection points 410 and 415 may be disposed in the same layer, and the X coordinates thereof may be the same and the Y coordinates thereof may be different. The integrated circuit 400 may include, for example, a conductive pattern 420 disposed between the first and second connection points 410 and 415, and air-gap patterns 430 and 435 disposed on opposite sides of the conductive pattern 420.

In an exemplary embodiment, the conductive pattern 420 may correspond to a timing critical path. Accordingly, air-gap patterns 430 and 435 (denoted by AGPa in FIGS. 13A and 13B) may be disposed on opposite sides of the conductive pattern 420. The conductive pattern 420 may extend in the Y direction, and accordingly, the air-gap patterns 430 and 435 also may extend in the Y direction. The conductive pattern 420 may correspond to, for example, the fifth or sixth wiring layer M5 or M6 of FIG. 8.

Figure 14A:
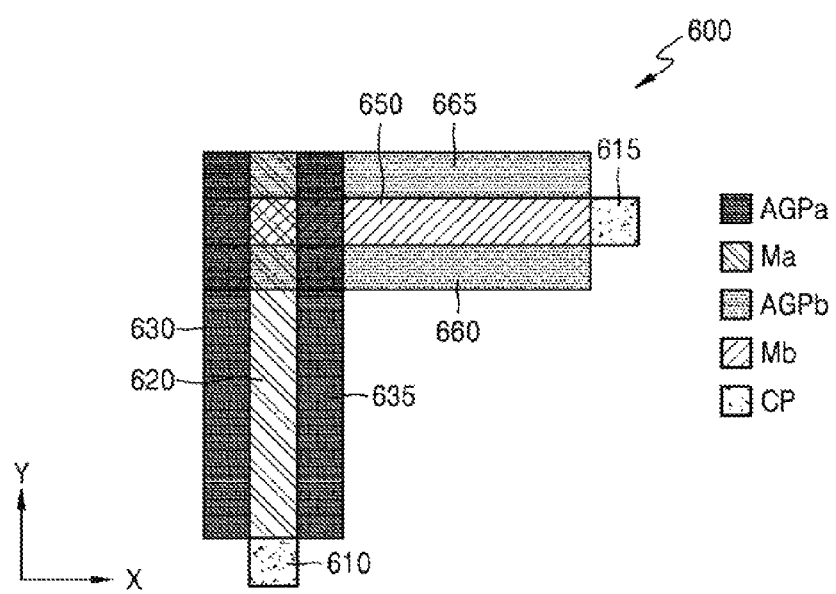
FIG. 14A is a plan view illustrating an integrated circuit routed by applying an air-gap pattern, according to an exemplary embodiment of the inventive concept.
Figure 14B:
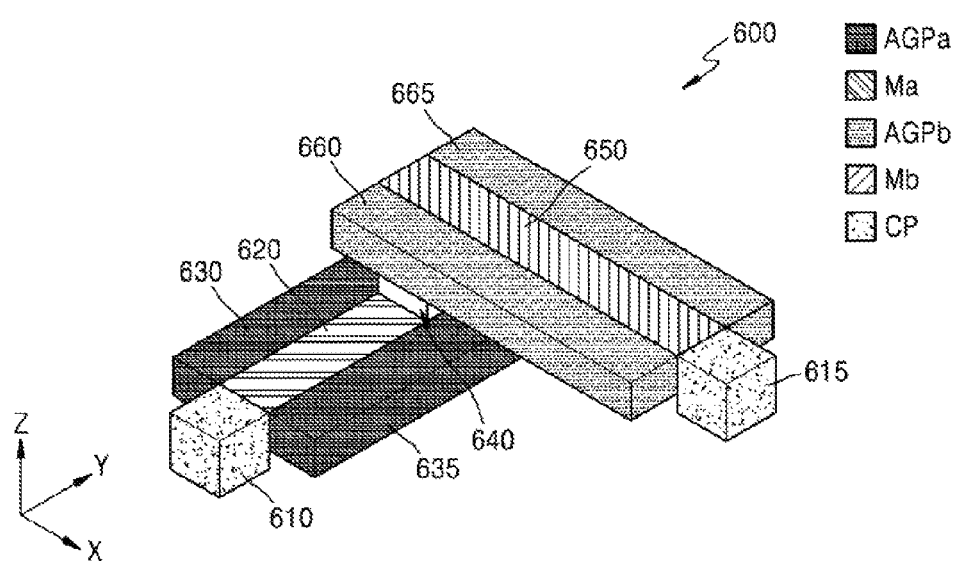
FIG. 14B is a perspective view illustrating the integrated circuit of FIG. 14A, according to an exemplary embodiment of the inventive concept.

FIG. 14A is a plan view illustrating an integrated circuit 600 routed by applying an air-gap pattern according to an exemplary embodiment of the inventive concept. FIG. 14B is a perspective view illustrating the integrated circuit 600 of FIG. 14A according to an exemplary embodiment of the inventive concept.

Referring to FIGS. 14A and 14B, the integrated circuit 600 may correspond to one net including first and second connection points 610 and 615 (denoted by CP in FIGS. 14A and 14B) and first and second conductive patterns 620 and 650 (denoted by Ma and Mb, respectively, in FIGS. 14A and 14B). The first and second connection points 610 and 615 may be disposed in different layers, and the X coordinates and the Y coordinates thereof may be different. The integrated circuit 600 may include, for example, a first conductive pattern 620 connected to the first connection point 610, a via 640 disposed on the first conductive pattern 620, a second conductive pattern 650 disposed on the via 640, first air-gap patterns 630 and 635 (denoted by AGPa in FIGS. 14A and 14B) disposed on opposite sides of the first conductive pattern 620, and second air-gap patterns 660 and 665 (denoted by AGPb in FIGS. 14A and 14B) disposed on opposite sides of the second conductive pattern 650.

In an exemplary embodiment, the first and second conductive patterns 620 and 650 may correspond to a timing critical path. Accordingly, the first air-gap patterns 630 and 635 may be disposed on opposite sides of the first conductive pattern 620, and the second air-gap patterns 660 and 665 may be disposed on opposite sides of the second conductive pattern 650. The first conductive pattern 620 may extend in the Y direction, and accordingly, the first air-gap patterns 630 and 635 also may extend in the Y direction. The second conductive pattern 650 may extend in the X direction, and accordingly, the second air-gap patterns 660 and 665 also may extend in the X direction. The first and second conductive patterns 620 and 650 may correspond to, for example, the fifth and sixth wiring layers M5 and M6 of FIG. 8, respectively.

In this way, according to an exemplary embodiment of the inventive concept, the first air-gap patterns 630 and 635 may be disposed to extend in Y direction, and the second air-gap patterns 660 and 665 may be disposed to extend in the X direction. Thus, the first and second air-gap patterns 630, 635, 660, and 665 are implemented by bidirectional air-gap patterns. As a result, two consecutive layers adjacent (e.g., directly adjacent) to each other in the Z direction may be implemented by air-gap layers (e.g., each consecutive layer may include an air-gap pattern). For example, when only unidirectional air-gap patterns are utilized, two adjacent (e.g., directly adjacent) layers may not be implemented by air-gap layers, and only layers arranged alternately may be implemented by air-gap layers. In exemplary embodiments of the inventive concept, bidirectional air-gap patterns are utilized to allow for two consecutive layers adjacent (e.g., directly adjacent) to each other in the Z direction to be implemented by air-gap layers. For example, according to exemplary embodiments, two layers adjacent (e.g., directly adjacent) to each other may respectively include air-gap patterns. As a result, according to exemplary embodiments of the inventive concept, a parasitic capacitance between the conductive patterns corresponding to a net of a timing critical path may be decreased, and the operational speed of the integrated circuit and a chip including the integrated circuit may be improved.

Figure 15:
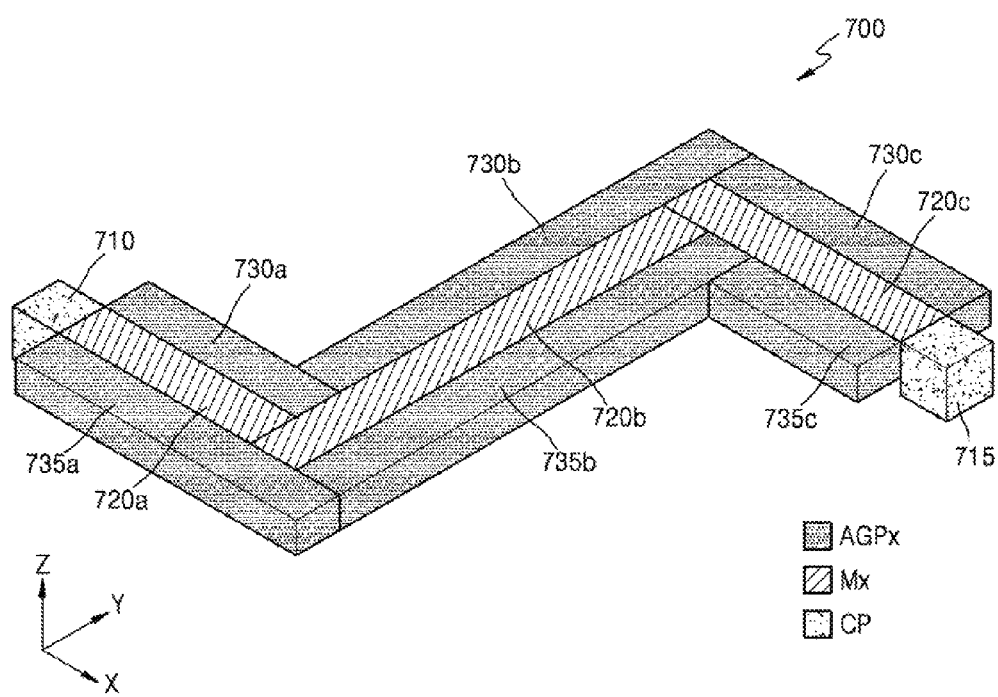
FIG. 15 is a perspective view illustrating an integrated circuit routed by applying an. air-gap pattern, according to an exemplary embodiment of the inventive concept.

FIG. 15 is a perspective view illustrating an integrated circuit 700 routed by applying an air-gap pattern according to an exemplary embodiment of the present inventive concept.

Referring to FIG. 15, the integrated circuit 700 may correspond to one net including first and second connection points 710 and 715 (denoted by CP in FIG. 15) and first to third conductive patterns 720a to 720c (denoted by Mx in FIG. 15). The first and second connection points 710 and 715 may be disposed in the same layer, and the X coordinates and the Y coordinates thereof may be different. The first to third conductive patterns 720a to 720c may be disposed in the same layer. The first to third conductive patterns 720a to 720c may correspond to, for example, the fifth or sixth wiring layer M5 or M6 of FIG. 8.

In an exemplary embodiment, the first to third conductive patterns 720a to 720c disposed in the same layer may correspond to a timing critical path. Accordingly, the first to third conductive patterns 720a to 720c may be implemented by air-gap conductive patterns. For example, first air-gap patterns 730a and 735a (denoted by AGPx in FIG. 15) may be disposed on opposite sides of the first conductive pattern 720a. The first conductive pattern 720a and the first air-gap patterns 730a and 735a may extend in the X direction. Second air-gap patterns 730b and 735b (denoted by AGPx in FIG. 15) may be disposed on opposite sides of the second conductive pattern 720b. The second conductive pattern 720b and the second air-gap patterns 730b and 735b may extend in the Y direction. Third air-gap patterns 730c and 735c (denoted by AGPx in FIG. 15) may be disposed on opposite sides of the third conductive pattern 720c. The third conductive pattern 720c and the third air-gap patterns 730c and 735c may extend in the X direction.

The second air-gap patterns 730b and 735b may extend in Y direction, and the first air-gap patterns 730a and 735a and the third air-gap patterns 730c and 735c may extend in the X direction. Thus, in an exemplary embodiment, the first to third air-gap patterns 730a to 735c, which are disposed in the same layer, may be implemented by bidirectional air-gap patterns. Thus, in an exemplary embodiment, conductive patterns extending in different directions and disposed in the same layer may be implemented by air-gap conductive patterns.

Figure 16:
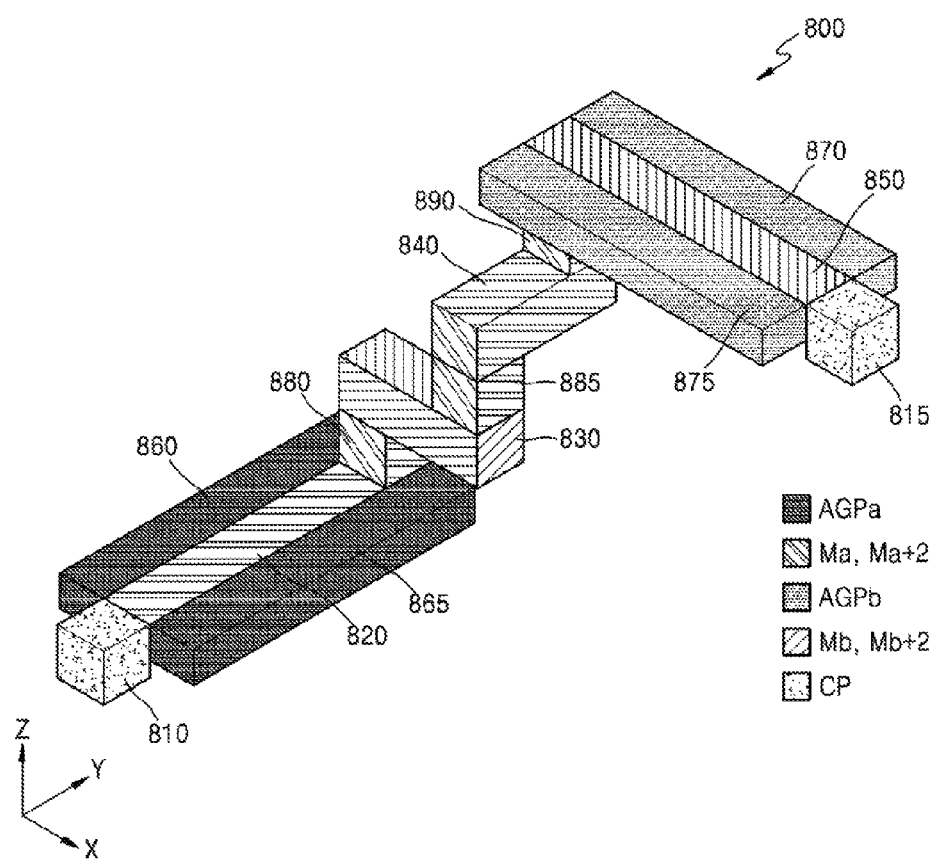
FIG. 16 is a perspective view illustrating an integrated circuit routed by applying an air-gap pattern, according to an exemplary embodiment of the inventive concept.

FIG. 16 is a perspective view illustrating an integrated circuit 800 routed by applying an air-gap pattern according to an exemplary embodiment of the present inventive concept.

Referring to FIG. 16, the integrated circuit 800 may correspond to one net including first and second connection points 810 and 815 (denoted by CP in FIG. 16) and first to fourth conductive patterns 820 to 850 (denoted by Ma, Ma+2, and Mb, Mb+2 in FIG. 16). The first and second connection points 810 and 815 may be disposed in different layers, and the X coordinates and the Y coordinates thereof may be different. The first to fourth conductive patterns 820 to 850 may be disposed in different layers. The first and second conductive patterns 820 and 830 may correspond to the fifth and sixth wiring layers M5 and M6 of FIG. 8, respectively, and the third and fourth conductive patterns 840 and 850 may correspond to seventh and eighth wiring layers disposed above the sixth wiring layer M6.

The integrated circuit 800 may include, for example, a first conductive pattern 820 connected to the first connection point 810, a via 880 disposed on the first conductive pattern 820, a second conductive pattern 830 disposed on the via 880, a via 885 disposed on the second conductive pattern 830, a third conductive pattern 840 disposed on the via 885, a via 890 disposed on the third conductive pattern 840, and a fourth conductive pattern 850 disposed on the via 890. The integrated circuit 800 may further include first air-gap patterns 860 and 865 (denoted by AGPa in FIG. 16) disposed on opposite sides of the first conductive pattern 820, and second air-gap patterns 870 and 875 (denoted by AGPb in FIG. 16) disposed on opposite sides of the fourth conductive pattern 850.

In an exemplary embodiment, the first to fourth conductive patterns 820 to 850 disposed in different layers may correspond to a timing critical path. In an exemplary embodiment, the first and fourth conductive patterns 820 and 850 may be implemented by air-gap conductive patterns. For example, first air-gap patterns 860 and 865 may be disposed on opposite sides of the first conductive pattern 820. The first conductive pattern 820 and the first air-gap patterns 860 and 865 may extend in the Y direction. Second air-gap patterns 870 and 875 may be disposed on opposite sides of the fourth conductive pattern 850. The fourth conductive pattern 850 and the second air-gap patterns 870 and 875 may extend in the X direction.

Thus, according to an exemplary embodiment, the first air-gap patterns 860 and 865 may extend in the Y direction, and the second air-gap patterns 870 and 875 may extend in the X direction. Thus, in an exemplary embodiment, the first and second air-gap patterns 860, 865, 870, and 875 may be implemented by bidirectional air-gap patterns. Accordingly, in an exemplary embodiment, two discontinuous layers, which are not adjacent (e.g., directly adjacent) in the Z direction, may be implemented by air-gap layers. For example, in an exemplary embodiment, two layers that are not directly adjacent to each other (e.g., two layers that have intervening layers disposed therebetween) may be implemented by air-gap layers, and the intervening layers are not implemented by air-gap layers (e.g., the intervening layers may include an IMD including a general dielectric material disposed on at least one side thereof).

Figure 17:
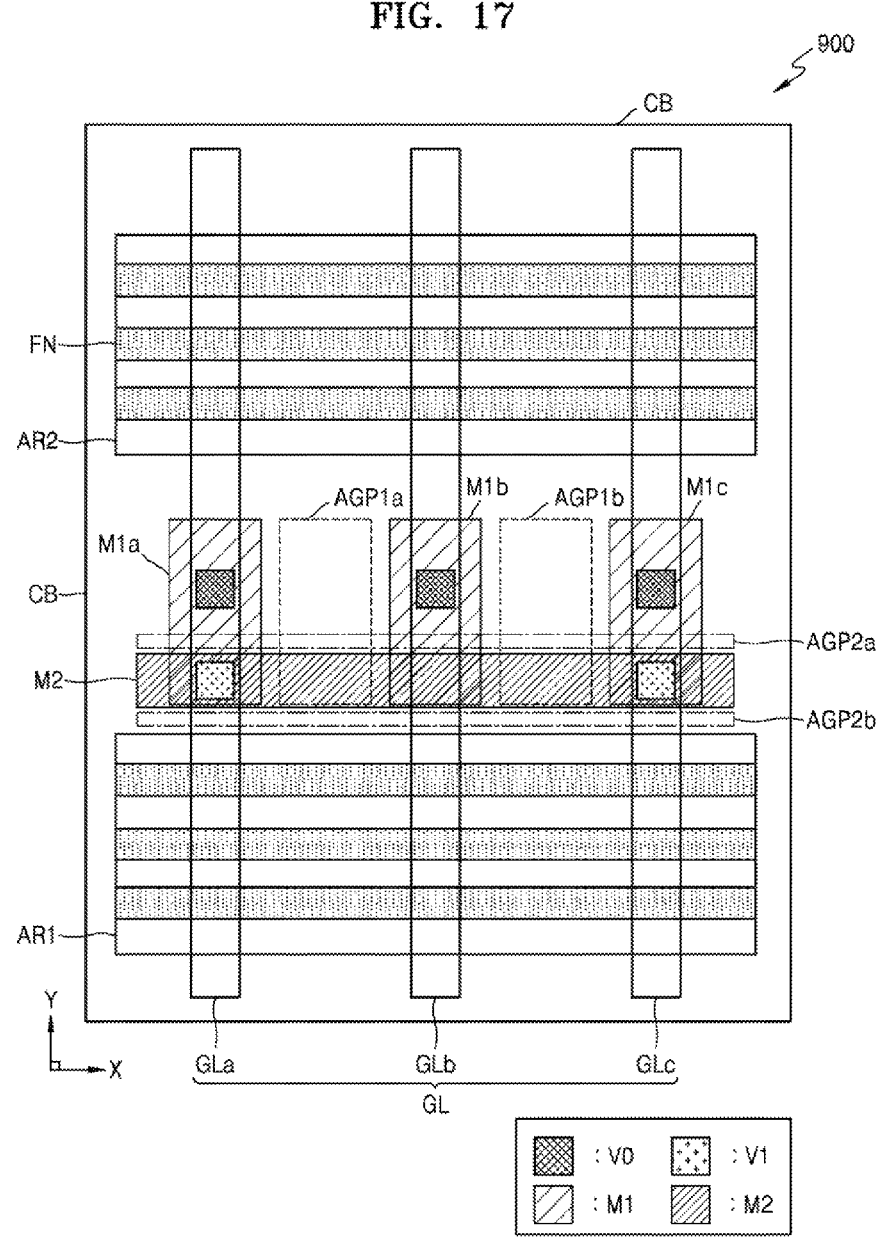
FIG. 17 is a layout of a standard cell included in an integrated circuit, according to an exemplary embodiment of the inventive concept.

FIG. 17 is a layout of a standard cell 900 included in an integrated circuit according to an exemplary embodiment of the inventive concept.

Referring to FIG. 17, the standard cell 900 may be defined by a cell boundary CB, and may include a plurality of fins FN, first and second active areas AR1 and AR2, a plurality of gate lines GLa, GLb, and GLe (GL), a plurality of first metal lines M1a, M1b, and M1c (M1), and a second metal line M2. The standard cell 900 may further include first air-gap patterns AGP1a and AGP1b and second air-gap patterns AGP2a and AGP2b. The first metal line M1a, a second via V1 disposed on the first metal line M1b, and the second metal line M2 may correspond to a timing critical net.

The cell boundary CB is an outline defining the standard cell 900. The placing and routing tool (for example, component 13a of FIG. 3 or component 22a of FIG. 4) may recognize the standard cell 900 using the cell boundary CB. The cell boundary CB includes four boundary lines.

The plurality of fins FN may extend in the X direction, and may be disposed substantially in parallel to one another along the Y direction, which is substantially perpendicular to the X direction. The first active area AR1 and the second active area AR2 may be disposed substantially in parallel to each other, and may have different conductive types. For example, in an exemplary embodiment, three fins FN may be disposed in each of the first and second active areas AR1 and AR2. However, the inventive concept is not limited thereto. For example, in an exemplary embodiment, the number of fins disposed in each of the first and second active areas AR1 and AR2 may be changed.

The plurality of fins FN disposed in the first and second active areas AR1 and AR2 may be referred to as active fins. Although FIG. 17 illustrates only active fins, the inventive concept is not limited thereto. For example, in an exemplary embodiment, the standard cell 900 may further include dummy fins disposed in an area between the cell boundary CB and the first active area AR1, an area between the first and second active areas AR1 and AR2, or an area between the second active area AR2 and the cell boundary CB.

The plurality of gate lines GL may extend in the Y direction, and may be disposed substantially in parallel to one another along the X direction. The gate lines GL may include an electrically conductive material such as, for example, polysilicon, a metal, or a metal alloy. For convenience of illustration, FIG. 17 illustrates that the standard cell 900 includes three gate lines GL. However, the inventive concept is not limited thereto. For example, according to exemplary embodiments, the standard cell 900 may include four or more gate lines GL extending in the Y direction and disposed in parallel to one another in the X direction.

First vias V0 may be disposed on the plurality of gate lines GLa, GLb, and GLc, respectively, and may electrically connect the plurality of gate lines GLa, GLb, and GLc and the plurality of first metal lines M1a, M1b, and M2c, respectively. The first vias V0 may include an electrically conductive material such as, for example, polysilicon, a metal, or a metal alloy.

The plurality of first metal lines M1 may form one layer disposed on the plurality of gate lines GL. The first metal line M1a may correspond to, for example, the first conductive pattern 620 of FIG. 14B. The first metal lines M1 may include an electrically conductive material such as, for example, polysilicon, a metal, or a metal alloy.

In an exemplary embodiment, the first metal lines M1 may extend only in the Y direction, and may be disposed substantially in parallel to one another along the X direction. However, the inventive concept is not limited thereto. For example, in exemplary embodiments, a part of a first metal line of the first metal lines M1 may extend in the Y direction and another part thereof may form an L shape extending in the X direction. For convenience of illustration, FIG. 17 illustrates that the standard cell 900 includes three first metal lines M1. However, the inventive concept is not limited thereto. For example, according to exemplary embodiments, the standard cell 900 may include four or more first metal lines M1.

The second vias V1 may be disposed on the plurality of first metal lines M1a and M1c, respectively, and may connect the plurality of first metal lines M1a and M1c and the second metal line M2. The second via V1 disposed on the first metal line M1a may correspond to the via 640 of FIG. 14B. The second vias V1 may include an electrically conductive material such as, for example, polysilicon, a metal, or a metal alloy.

The second metal line M2 may form one layer disposed on the plurality of first metal lines M1. The second metal line M2a may correspond to, for example, the second conductive pattern 650 of FIG. 14B. The second metal line M2 may include an electrically conductive material such as, for example, polysilicon, a metal, or a metal alloy.

The second metal line M2 may extend only in the X direction. However, the inventive concept is not limited thereto. For example, in exemplary embodiments, a part of the second metal line M2 may extend in the X direction and another part thereof may form an L shape extending in the Y direction. For convenience of illustration, FIG. 17 illustrates that the standard cell 900 includes one second metal line M2. However, the inventive concept is not limited thereto. For example, according to exemplary embodiments, the standard cell 900 may include two or more second metal lines M2.

According to an exemplary embodiment, the first air-gap patterns AGP1a and AGP1b may be disposed between the plurality of first metal lines M1a to M1c. The first air-gap patterns AGP1a and AGP1b may extend in the Y direction. The plurality of first metal lines M1a to M1c and the first air-gap patterns AGP1a and AGP1b may form a first air-gap layer. As a result, according to exemplary embodiments of the inventive concept, a parasitic capacitance between the plurality of first metal lines Ma1 to M1c may decrease.

According to an exemplary embodiment, the second air-gap patterns AGP2a and AGP2b may be disposed on opposite sides of the first metal line M2. The second air-gap patterns AGP2a and AGP2b may extend in the X direction. The second metal line M2 and the second air-gap patterns AGP2a and AGP2b may form a second air-gap layer. As a result, according to exemplary embodiments of the inventive concept, a parasitic capacitance between the second metal line M2 and an adjacent metal line may decrease.

As described with reference to FIGS. 1 to 17, according to exemplary embodiments of the inventive concept, in a process of designing a layout of an integrated circuit, a timing critical path from among a plurality of timing paths in a placed standard cell may be selected, and at least one net from among the nets of the selected timing critical path may be selected. Subsequently, the selected at least one net may be pre-routed with an air-gap layer, and nets of non-critical paths and/or unselected nets of the timing critical path may be routed with a normal layer (e.g., without an air-gap layer). As a result, according to exemplary embodiments of the inventive concept, a high performance integrated circuit may be implemented at low costs by using a small number of air-gap layers.

Figure 18:
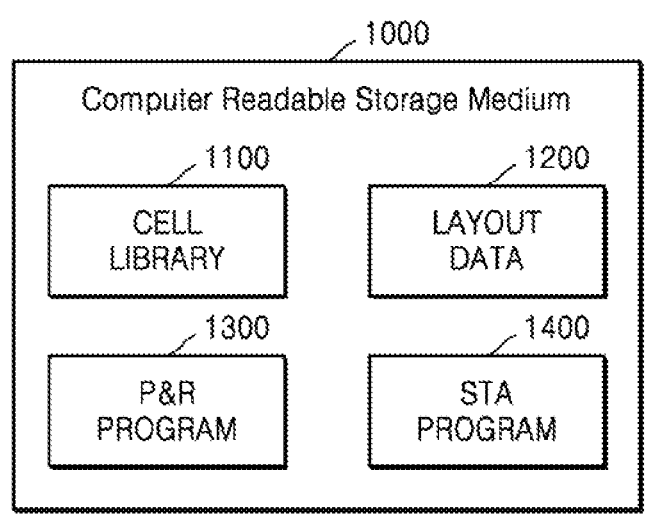
FIG. 18 is a block diagram illustrating a storage medium, according to an exemplary embodiment of the inventive concept.

FIG. 18 is a block diagram illustrating a storage medium 1000 according to an exemplary embodiment of the inventive concept.

Exemplary embodiments of the inventive concept may be embodied directly in hardware, in a software module executed by a processor, or in a combination of the two. A software module may be tangibly embodied on a non-transitory program storage device, such as the storage medium 1000 of FIG. 18.

Referring to FIG. 18, the storage medium 1000 may store a cell library 1100, layout data 1200, a placing and routing program 1300, and a timing analysis program 1400. The storage medium 1000 is a computer-readable storage medium (e.g., a non-transitory computer-readable storage medium), and may include a storage medium that may be read by a computer to provide instructions and/or data to the computer. The instructions may be executed by a processor of the computer. The computer-readable storage medium 1000 may include, for example, a magnetic or optical medium such as a disk, a tape, a CD-ROM, a DVD-ROM, a CD-R, a CD-RW, a DVD-R, or a DVD-RW, a volatile or nonvolatile memory such as a RAM, a ROM, or a flash memory, a nonvolatile memory that may be accessed through a USB interface, and a microelectromechanical system (MEMS). However, the computer-readable storage medium 1000 is not limited thereto. The computer-readable storage medium may be inserted into a computer, may be integrated in a computer, or may be combined with a computer through a communication medium such as a wired or wireless network.

The cell library 1100 may be a standard cell library, and may include information regarding a standard cell, which is a unit constituting an integrated circuit. In an exemplary embodiment, the information regarding a standard cell may include layout information necessary for generating a layout. In an exemplary embodiment, the information regarding a standard cell may include, for example, timing information necessary for verifying or simulating a layout.

The layout data 1200 may include physical information regarding the layout generated through a placing and routing operation. In an exemplary embodiment, the layout data 1200 may include, for example, the widths and spacing values of conductive patterns, and the number and sizes of air-gap patterns arranged between the conductive patterns.

The placing and routing program 1300 may include a plurality of instructions to perform a method of generating a layout of an integrated circuit by using a standard cell library according to exemplary embodiments. For example, the placing and routing program 1300 may be used to perform operations S110 and S130 of FIG. 1, operations S210, S260, and S270 of FIG. 5, or operations S310, S320, S350, and S360 of FIG. 6.

The timing analysis program 1400 may be, for example, an STA program. The STA may correspond to a simulation method of calculating an expected timing of a digital circuit. A timing analysis may be performed on all timing paths of the placed standard cells and a timing analysis result may be output. The STA program 1400 may be used to perform, for example, operation S120 of FIG. 1, operations S240 and S250 of FIG. 5, or operation S330 of FIG. 6.

In exemplary embodiments, the storage medium 1000 may further store an analysis program. The analysis program may include a plurality of instructions for performing a method of analyzing an integrated circuit based on input data defining the integrated circuit. In exemplary embodiments, the storage medium 1000 may further store a data structure. The data structure may include a storage space for extracting specific information from the cell library 1100, or managing data generated in a process of analyzing characteristics of an integrated circuit with an analysis program.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A computer-implemented method of manufacturing an integrated circuit, comprising:
   placing a plurality of standard cells that define the integrated circuit;
   selecting a timing critical path that has a timing delay exceeding a timing constraint from among a plurality of timing paths included in the placed standard cells;
   selecting at least one net from among a plurality of nets included in the timing critical path as at least one timing critical net;
   pre-routing the at least one timing critical net with an air-gap layer such that an air-gap pattern of the air-gap layer is formed adjacent to at least a portion of the at least one timing critical net;
   routing unselected nets without the air-gap layer;
   generating a layout using the pre-routed at least one timing critical net and the routed unselected nets; and
   manufacturing the integrated circuit based on the layout.

2. The computer-implemented method of claim 1, wherein the air-gap layer includes the air-gap pattern, and the unselected nets are routed with a layer that does not include the air-gap pattern.

3. The computer-implemented method of claim 1, wherein the unselected nets are included in at least one non-critical path from among the plurality of timing paths.

4. The computer-implemented method of claim 1, wherein the unselected nets are included in the timing critical path.

5. The computer-implemented method of claim 1, wherein the timing delay of the timing critical path is from an input of the timing critical path to an output of the timing critical path.

6. The computer-implemented method of claim 1, wherein manufacturing the integrated circuit comprises:
   generating a mask based on the layout; and
   manufacturing the integrated circuit using the mask.

7. The computer-implemented method of claim 1, further comprising:
   trial-routing the placed standard cells; and
   performing timing analysis on the trial-routed standard cells to generate timing analysis data,
   wherein the timing critical path is selected from among the plurality of timing paths based on the timing analysis data.

8. The computer-implemented method of claim 1, further comprising: performing timing analysis on the standard cells to generate timing analysis data, wherein the timing critical path is selected from among the plurality of timing paths based on the timing analysis data.

9. The method of claim 8, wherein the at least one net is selected as the at least one timing critical net based on the timing analysis data.

10. The computer-implemented method of claim 1, wherein placing the plurality of standard cells, pre-routing the at least one timing critical net, and routing the unselected nets are performed during a backend design process of an integrated circuit design process.

11. The computer-implemented method of claim 1, wherein the plurality of standard cells are placed using a placement and routing tool.

12. A computer-implemented method of manufacturing an integrated circuit, comprising:

placing a plurality of standard cells that define the integrated circuit;

selecting a timing critical path that has a timing delay exceeding a timing constraint from among a plurality of timing paths included in the placed standard cells;

selecting at least one net from among a plurality of nets included in the timing critical path as at least one timing critical net, wherein the at least one timing critical net comprises:
    a first conductive pattern extending in a first direction;
    a second conductive pattern extending in a second direction different from the first direction; and
    a first via electrically connecting the first conductive pattern and the second conductive pattern;

pre-routing the at least one timing critical net with an air-gap layer, wherein the air-gap layer comprises:
    a first air-gap pattern extending in the first direction and disposed on a first side of the first conductive pattern; and
    a second air-gap pattern extending in the second direction and disposed on a first side of the second conductive pattern;

routing unselected nets without the air-gap layer;

generating a layout using the pre-routed at least one timing critical net and the routed unselected nets; and manufacturing the integrated circuit based on the layout.

13. The computer-implemented method of claim 12, wherein the first direction is substantially perpendicular to the second direction.

14. The computer-implemented method of claim 12, wherein the first conductive pattern and the second conductive pattern are consecutive conductive patterns in a third direction that is different from the first and second directions.

15. The computer-implemented method of claim 12, wherein the first conductive pattern and the second conductive pattern are non-consecutive conductive patterns in a third direction that is different from the first and second directions.

16. The computer-implemented method of claim 12, wherein the at least one timing critical net further comprises:
    a third conductive pattern extending in the second direction and connected to the first conductive pattern through the first via;
    a fourth conductive pattern extending in the first direction;
    a second via connecting the third conductive pattern and the fourth conductive pattern; and
    a third via connecting the fourth conductive pattern and the second conductive pattern,
    wherein the third conductive pattern and the fourth conductive pattern are disposed between the first conductive pattern and the second conductive pattern.

17. The computer-implemented method of claim 12, wherein the at least one timing critical net further comprises:
    a third conductive pattern extending in the first direction; and
    a second via electrically connecting the second conductive pattern and the third conductive pattern,
    wherein the air-gap layer further comprises:
    a third air-gap pattern extending in the first direction and disposed on a first side of the third conductive pattern.

* * * * *